United States Patent
Kim et al.

(10) Patent No.: US 8,654,685 B2
(45) Date of Patent: Feb. 18, 2014

(54) APPARATUS FOR SHARING A WIRELESS COMMUNICATION BASE STATION

(75) Inventors: Duk-Yong Kim, Gyeonggi-do (KR); Nam-Shin Park, Gyeonggi-do (KR)

(73) Assignee: KMW Inc., Gyeonggi-Do (KR)

( * ) Notice: Subject to any disclaimer, the term of this patent is extended or adjusted under 35 U.S.C. 154(b) by 686 days.

(21) Appl. No.: 12/885,733

(22) Filed: Sep. 20, 2010

(65) Prior Publication Data

US 2011/0069644 A1    Mar. 24, 2011

Related U.S. Application Data

(60) Provisional application No. 61/244,155, filed on Sep. 21, 2009, provisional application No. 61/257,098, filed on Nov. 2, 2009, provisional application No. 61/265,830, filed on Dec. 2, 2009.

(51) Int. Cl.
    *H04B 7/005* (2006.01)
(52) U.S. Cl.
    USPC ........................ 370/278; 370/338; 455/561
(58) Field of Classification Search
    USPC .......................................... 370/278, 328, 339
    See application file for complete search history.

(56) References Cited

U.S. PATENT DOCUMENTS

| | | | |
|---|---|---|---|
| 7,346,323 B2 * | 3/2008 | Ahonpaa | 455/272 |
| 2002/0080068 A1 * | 6/2002 | Kim et al. | 342/374 |
| 2005/0159180 A1 | 7/2005 | Cheng | |
| 2008/0032745 A1 * | 2/2008 | Kim et al. | 455/562.1 |
| 2008/0253345 A1 | 10/2008 | Sanguinetti | |
| 2009/0069053 A1 * | 3/2009 | Kim et al. | 455/561 |

FOREIGN PATENT DOCUMENTS

| | | |
|---|---|---|
| KR | 10-2006-0057431 A | 5/2006 |
| WO | 01-35684 A2 | 5/2001 |

OTHER PUBLICATIONS

Korean Intellectual Property Office, International Search Report for PCT/KR2010/006406, May 18, 2011, p. 1-3.

* cited by examiner

*Primary Examiner* — Anh-Vu Ly
*Assistant Examiner* — Hashim Bhatti

(57) ABSTRACT

A wireless communication base station shares one antenna between a main system and a subsystem. A signal combiner/divider is connected to each of the transmission/reception signal lines of a main and a subsystem duplexer and combines signals according to their phases and divides other signals. A filter is provided in the signal paths between the combiners/dividers.

22 Claims, 21 Drawing Sheets

APPARATUS FOR SHARING A WIRELESS COMMUNICATION BASE STATION

CROSS-REFERENCE TO RELATED PATENT APPLICATIONS

This application claims the benefit of U.S. Provisional Applications filed in the U.S. Patent and Trademark Office on Sep. 21, 2009, Nov. 2, 2009, and Dec. 2, 2009, and assigned Application Nos. 61/244,155, 61/257,098 and 61/265,830, respectively, the entire disclosures of which are hereby incorporated by reference.

BACKGROUND OF THE INVENTION

1. Field of the Invention

The present invention generally relates to a wireless communication system. More particularly, the present invention relates to a wireless communication base station sharing apparatus.

2. Description of the Related Art

As illustrated in FIGS. 1A, 1B and 1C, a plurality of service providers generally provide services through independent Base Stations (BSs) 10 and 12 in cellular, CDMA, PCS and GSM mobile communication systems and other wireless communication systems.

The resulting redundant investment in installation of individual BSs and unnecessary existence of too many BSs in an adjacent area lead to signal quality degradation due to mutual interference between the BSs.

It has occurred recently that one service provider merges other service providers and thus needs to provide services by integrating the frequency bands of the other service providers.

In this case, a need exists for unifying the existing system with the added systems to reduce cost.

One service provider may be assigned different frequencies in different areas in overseas countries. He must deploy BS systems operating in different frequency bands locally.

To overcome this problem, techniques for sharing a BS have been developed. One of the techniques is to share a BS antenna and a feeder cable by use of a new quadroplexer 132 covering the frequency bands of an existing BS system, for example, a system 10 (system A) and a sub-BS system, for example, a system 12 (system B), as illustrated in FIG. 1C.

This technique requires fabrication of such a quadroplexer as allows two systems to share an antenna and a feeder cable.

As described above, a new quadroplexer should be fabricated or a filter should be replaced or tuned in order to share an antenna and a feeder cable between an existing main BS system and an added sub-BS system. Therefore, much cost is incurred, including filter replacement cost and personnel expenses.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a wireless communication BS sharing apparatus for allowing an existing main BS system and an added sub-BS system to easily share a BS antenna and a feeder cable in deploying the sub-BS system in addition to the existing main BS system.

Another aspect of exemplary embodiments of the present invention provides a wireless communication BS sharing apparatus for allowing an existing main BS system and an added sub-BS system to easily share a BS antenna and a feeder cable without using additional equipment even though the frequency bands of the main BS system and the sub-BS system are changed in deploying the sub-BS system in addition to the existing main BS system.

In accordance with an aspect of exemplary embodiments of the present invention, there is provided a wireless communication base station sharing apparatus for sharing one antenna between a main system and a subsystem, in which a first signal combiner/divider is connected to a transmission/reception signal line of a main system duplexer through a first port, divides a signal received through the first port to second and third ports, combines signals received through the second and third ports according to the phases of the signals, and outputs the combined signal through the first port or a fourth port, a second signal combiner/divider is connected to a transmission/reception signal line of a subsystem duplexer through a fifth port and connected to the antenna through an eighth port, divides a signal received through the fifth port to sixth and seventh ports, combines signals received through the sixth and seventh ports according to the phases of the signals, and outputs the combined signal through the fifth port or eighth port, a first filter unit is provided in a signal path between the second port of the first signal combiner/divider and the sixth port of the second signal combiner/divider, includes a plurality of filters designed to have different pass bands and switches for selecting one of the plurality of filters, and filters all or a selected part of a predetermined frequency band, and a second filter unit is provided in a signal path between the third port of the first signal combiner/divider and the seventh port of the second signal combiner/divider, includes a plurality of filters designed to have different pass bands and switches for selecting one of the plurality of filters, and filters all or a selected part of a predetermined frequency band.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Preferred embodiments of the present invention will be described in detail with reference to the accompanying drawings. The specifics such as set forth in the description such as detailed elements are provided to assist in a comprehensive understanding of the invention. Accordingly, those of ordinary skill in the art will recognize that various changes and modifications of the embodiments described herein can be made without departing from the scope and spirit of the invention.

According to the present invention, the same or different service providers may operate a main system and a subsystem. The main system may be a Code Division Multiple Access (CDMA) system and the subsystem may be a Long Term Evolution (LTE) system.

It is assumed that the frequency bands of the main system and the subsystem are adjacent to each other. A criterion understood to those skilled in the art may be used to determine whether frequency bands are adjacent to each other. For example, if frequency bands are spaced from each other by about 100 MHz, it can be said that the frequency bands are adjacent. A dual-band antenna may be used according to the present invention.

In the present invention, when a main system is configured initially, it includes a plurality of filter units (each filter unit has a plurality of filters) and switches for switching to filters in each filter unit. If the frequency band of the main system is to be changed for such a reason as system addition (i.e. addition of a subsystem), switching of the switches suffice for changing the frequency band, thereby obviating the need for adding, removing, and reinstalling a filter. Preferably, the plurality of filter units has the same configuration. A photo coupler may be used to determine whether the switching has been completed. A plurality of switches may be controlled by use of at least one motor.

Figure 1A:
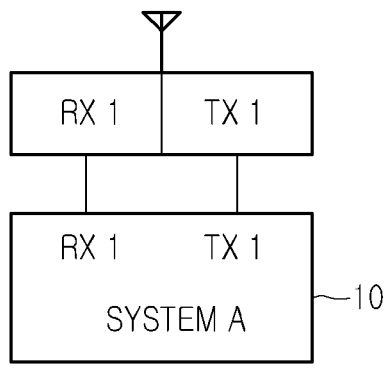
FIGS. 1A, 1B and 1C are block diagrams illustrating a conventional antenna sharing method.
Figure 1B:
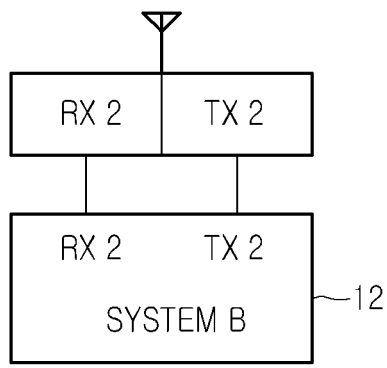
Figure 1C:
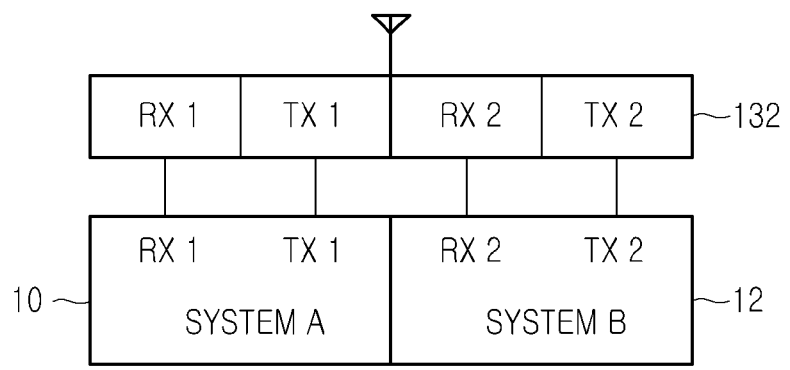
Figure 2:
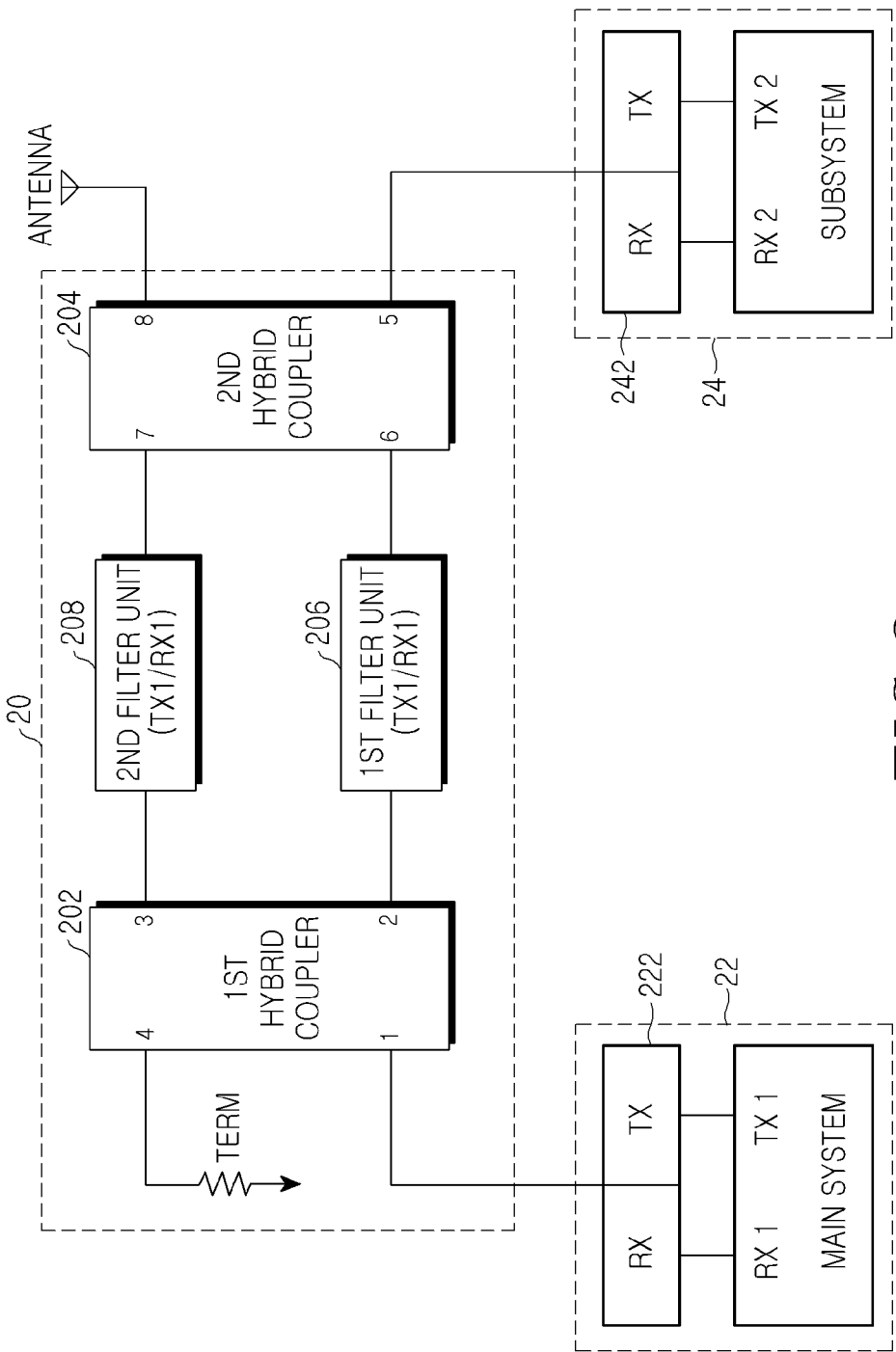
FIG. 2 is a block diagram of a wireless communication BS sharing apparatus according to an embodiment of the present invention.

FIG. 2 is a block diagram of a wireless communication BS sharing apparatus according to an embodiment of the present invention. Referring to FIG. 2, a wireless communication BS sharing apparatus 20 is configured such that an antenna is shared between a main system 22 having a third duplexer 222 and a subsystem 24 having a fourth duplexer 242.

This BS sharing apparatus 20 includes a first hybrid coupler 202 for dividing a transmission signal received from the main system 22 through a first port so that the divided signals have different phases, for example, a phase difference of 90 degrees and outputting the divided transmission signals with different phases, a first filter unit 206 connected to a second port of the first hybrid coupler 202, for filtering transmission and reception signals Tx1 and Rx1 of the main system 22, a second filter unit 208 connected to a third port of the first hybrid coupler 202, for filtering the transmission and reception signals Tx1 and Rx1 of the main system 22, and a second hybrid coupler 204 with a fifth port connected to the subsystem, for receiving signals from the first and second filter units 206 and 208 through sixth and seventh ports and combining the signals.

The antenna is connected to an eighth port of the second hybrid coupler 204.

The first and second filter units 206 and 208 are configured so as to pass all or a selected part of the transmission and reception frequency bands of the main system 22.

If the main system 22 is exchanged with the subsystem 24 in position, the first and second filter units 206 and 208 may include filters for passing only the transmission and reception frequency bands of the subsystem 24.

Operations will be described below.

Figure 3:
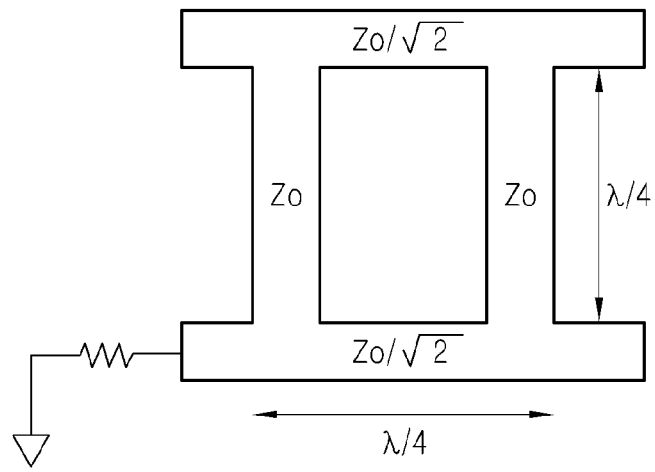
FIG. 3 is a view illustrating an operation of a hybrid coupler illustrated in FIG. 2.

With reference to FIG. 3, operations of the hybrid couplers will be described.

A hybrid coupler is characterized by a function to partially extract specific signal power and a function to divide a signal power into particular signal powers. The function to divide a specific signal power will be described in the present invention. The power of a signal received through the first port is divided into halves and the power-divided signals are output through the second and third ports, not through the fourth port. There is a 90-degree phase difference between the output signals. On the other hand, if signals with a 90-degree phase difference are received through the second and third ports, they are combined and output.

To be more specific, if a signal received through the second port has a phase of 90 degrees and a signal received through the third port has a phase of 180 degrees, the two signals are combined and output through the first port, not through the fourth port.

On the contrary, if a signal received through the second port has a phase of 180 degrees and a signal received through the third port has a phase of 90 degrees, the two signals are combined and output through the fourth port, not through the first port. Such parts with the signal power dividing/combining function are a hybrid ring, a branch-line directional coupler, a 3-dB directional coupler, and a magic T.

Transmission in Main System

Upon receipt of a transmission signal TX1 from the third duplexer 222 of the main system 22 through the first port of the first hybrid coupler 202, the first hybrid coupler 202 shifts the phase of the received signal by 90 degrees (or 0 degrees) and 180 degrees (or 90 degrees) and outputs the 90 degree-shifted signal and the 180 degree-shifted signal through the second and third ports, respectively. That is, the phase-shifted signals have a phase difference of 90 degrees.

The signals from the second and third ports pass through a Tx 1 filter of the second filter unit 208 and then are input to the sixth and seventh ports of the second hybrid coupler 204.

The second hybrid coupler 204 combines the signals received through the sixth and seventh ports and outputs the combined signal through the eighth port. This signal from the eighth port is radiated through the antenna.

Reception in Main System

Upon receipt of a signal from the antenna through the eighth port of the second hybrid coupler 204, the second hybrid coupler 204 shifts the phase of the received signal by 90 degrees and 180 degrees and outputs the 90 degree-shifted signal and the 180 degree-shifted signal through the seventh and sixth ports, respectively. That is, the phase-shifted signals have a phase difference of 90 degrees.

The signals from the sixth and seventh ports pass through Rx 1 filters of the first and second filter units 206 and 208 and are input to the second and third ports of the first hybrid coupler 202.

The first hybrid coupler 202 combines the signals received through the second and third ports and outputs the combined signal through the first port. This signal from the first port is received at the main system 22 through the third duplexer 222.

Transmission in Subsystem

A transmission signal TX2 from the subsystem 24 passes through the fourth duplexer 242 and is input to the second hybrid coupler 204 through the fifth port.

The second hybrid coupler 204 shifts the phase of the received signal by 90 degrees and 180 degrees, respectively, and outputs the 90 degree-shifted signal and the 180 degree-shifted signal through the sixth and seventh ports, respectively. That is, the phase-shifted signals have a phase difference of 90 degrees.

The signals from the sixth and seventh ports are fully reflected from the first and second filter units 206 and 208 and fed back to the sixth and seventh ports.

The feedback signals are combined and output through the eighth port. This signal from the eighth port is radiated through the antenna.

Reception in Subsystem

A signal received from the antenna is input to the second hybrid coupler 204 through the eighth port. The second hybrid coupler 204 shifts the phase of the received signal by 90 degrees and 180 degrees, respectively and outputs the 180 degree-shifted signal and the 90 degree-shifted signal through the seventh and sixth ports, respectively. That is, the phase-shifted signals have a phase difference of 90 degrees.

The signals from the sixth and seventh ports are combined and output through the fifth port.

The signal from the fifth port is received at a receiver of the sub-system 24 through the fourth duplexer 242.

Meanwhile, no reflection occurs theoretically during outputting the transmission signal Tx1 from the main system 22 through the first hybrid coupler 202 and thus there should be no signal output from the fourth port. In practice, however, the transmission signal Tx1 is output through the fourth port, although it is weak. To prevent this problem, a load resistor TERM is provided at the fourth port, for isolation.

Figure 4:
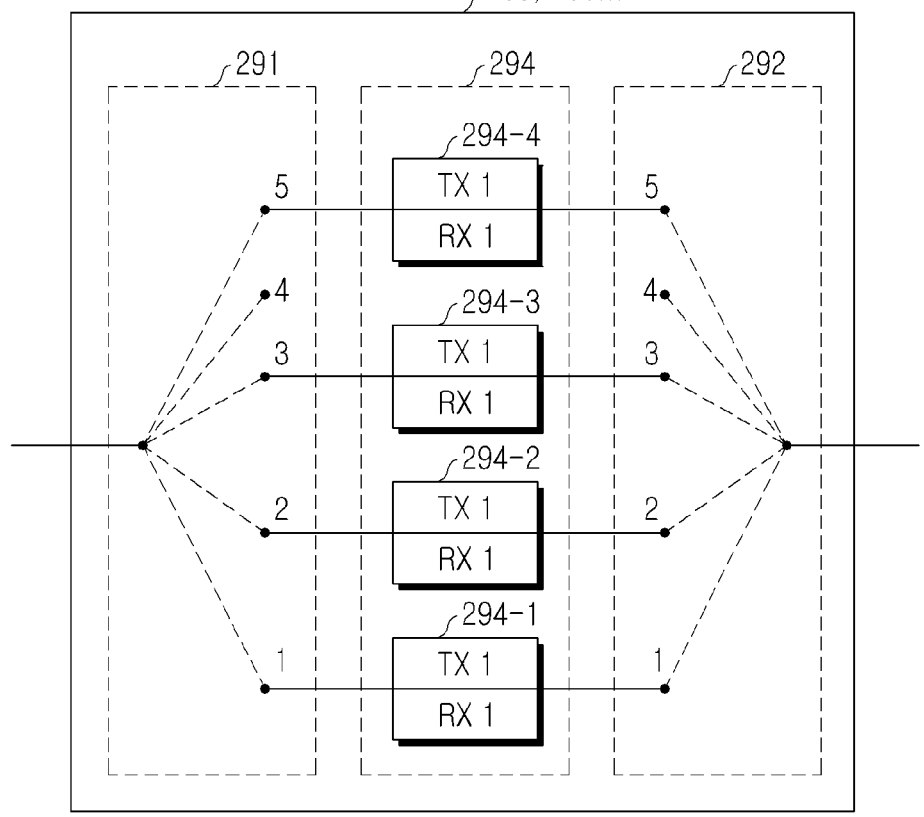
FIG. 4 is a detailed block diagram of a filter unit applicable as a first or second filter unit illustrated in FIG. 2, according to an embodiment of the present invention.
Figure 5:
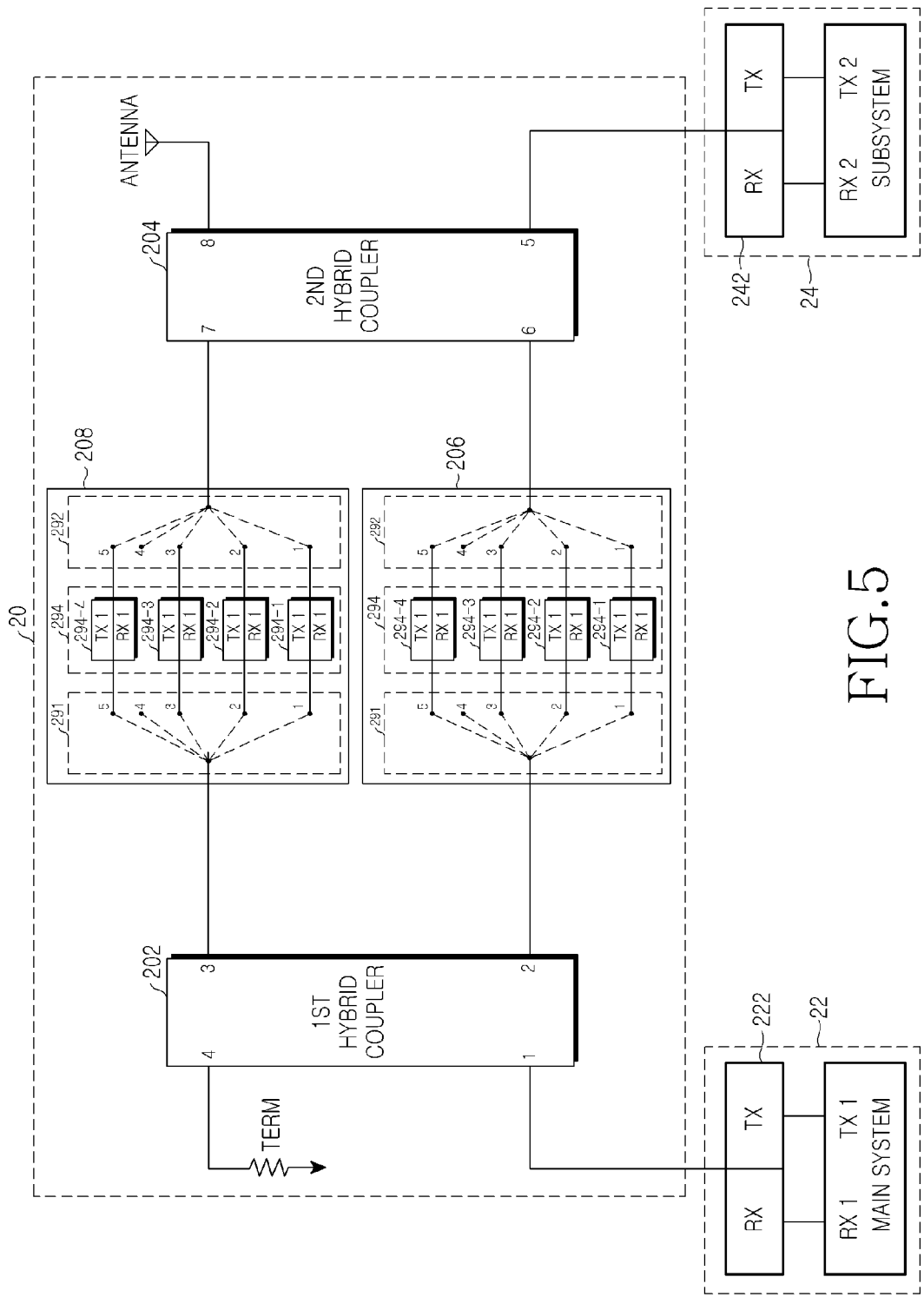
FIG. 5 is a block diagram of the wireless communication BS sharing apparatus using the filter unit illustrated in FIG. 4 according to the first embodiment of the present invention.

FIG. 4 is a detailed block diagram of a filter unit according to an embodiment of the present invention, which can be used as the first or second filter unit illustrated in FIG. 2. FIG. 5 illustrates the wireless communication BS sharing apparatus 20 using filter units having the configuration illustrated in FIG. 4. Referring to FIGS. 4 and 5, the filter unit applicable as the first and second filter units 206 and 208 for passing all or a selected part of the transmission and reception frequency bands of the main system 22 includes a filter bank 294 having a plurality of (three in FIG. 3) dual Band Pass Filters (BPFs) 294-1, 294-2, 294-3 and 294-4 designed to have different pass bands of the transmission and reception frequency bands of the main system 22, and first and second switches 291 and 292 of a 1:N switching structure (a 1:4 switching structure in the embodiment of the present invention) provided, respectively, at the input and output ends of the filter bank 294, for switching an input/output path to one or none of the plurality of dual BPFs 294-1, 294-2, 294-3 and 294-4 of the filter bank 294. The first and second switches 291 and 292 interact with each other to switch to dual BPFs having the same pass band among the plurality of dual BPFs.

The thus-constituted filter unit applicable as the first or second filter unit of FIG. 2 according to the present invention is configured so as to pass the whole or selected part of the transmission and reception frequency bands of the main system 22. The reason for designing the filter unit so that one dual BPF having an appropriate pass band can be selected from among the plurality of dual BPFs, rather than a dual BPF having a fixed frequency band is used is to actively adapt to both a case where the total transmission and reception frequency bands of a BS system are dedicated to the main system or a case where the transmission and reception frequency bands are separated for the main system and the subsystem.

For example, in the case where the service provider of a BS system provides a service to subscribers by operation system A, if operation system B has been developed to provide an enhanced service but an additional frequency band for operation system B cannot be secured, the service provider has to run operation system B in the existing limited frequency band.

Then, if some subscribers want to continue receiving the service through operation system A due to cost or for other reasons and other subscribers want to receive the enhanced service through operation system B, the service provider must change frequency allocation adaptively according to the numbers of subscribers based on operation systems A and B, while running the two operation systems within the limited frequency in order to satisfy the different demands of the subscribers.

For example, when only operation system A is used during an initial system implementation, the switches 291 and 292 are connected to the dual BPFs 294-1 and thus the total frequency band is used. If a part of the frequency band is used for operation system B, the switches 291 and 292 switch to one of the second, third and fourth dual BPFs 294-2 to 204-4, thereby operating both operation system A and operation system B.

Figure 19A:
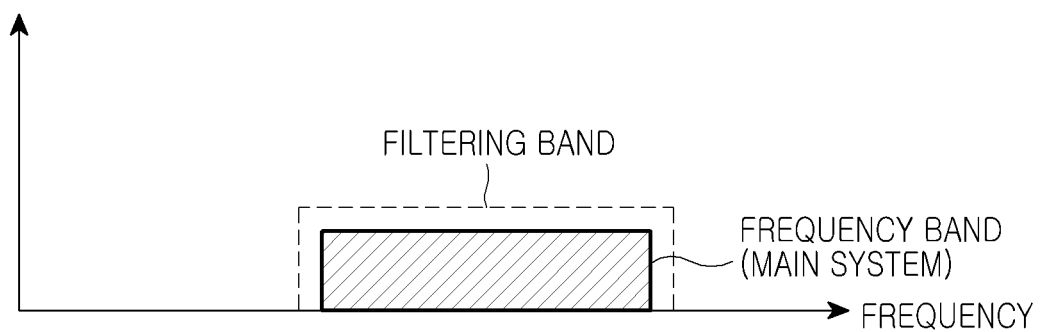
FIGS. 19A and 19B illustrate frequency allocation and selection when a subsystem is added by dividing a frequency band.
Figure 19B:
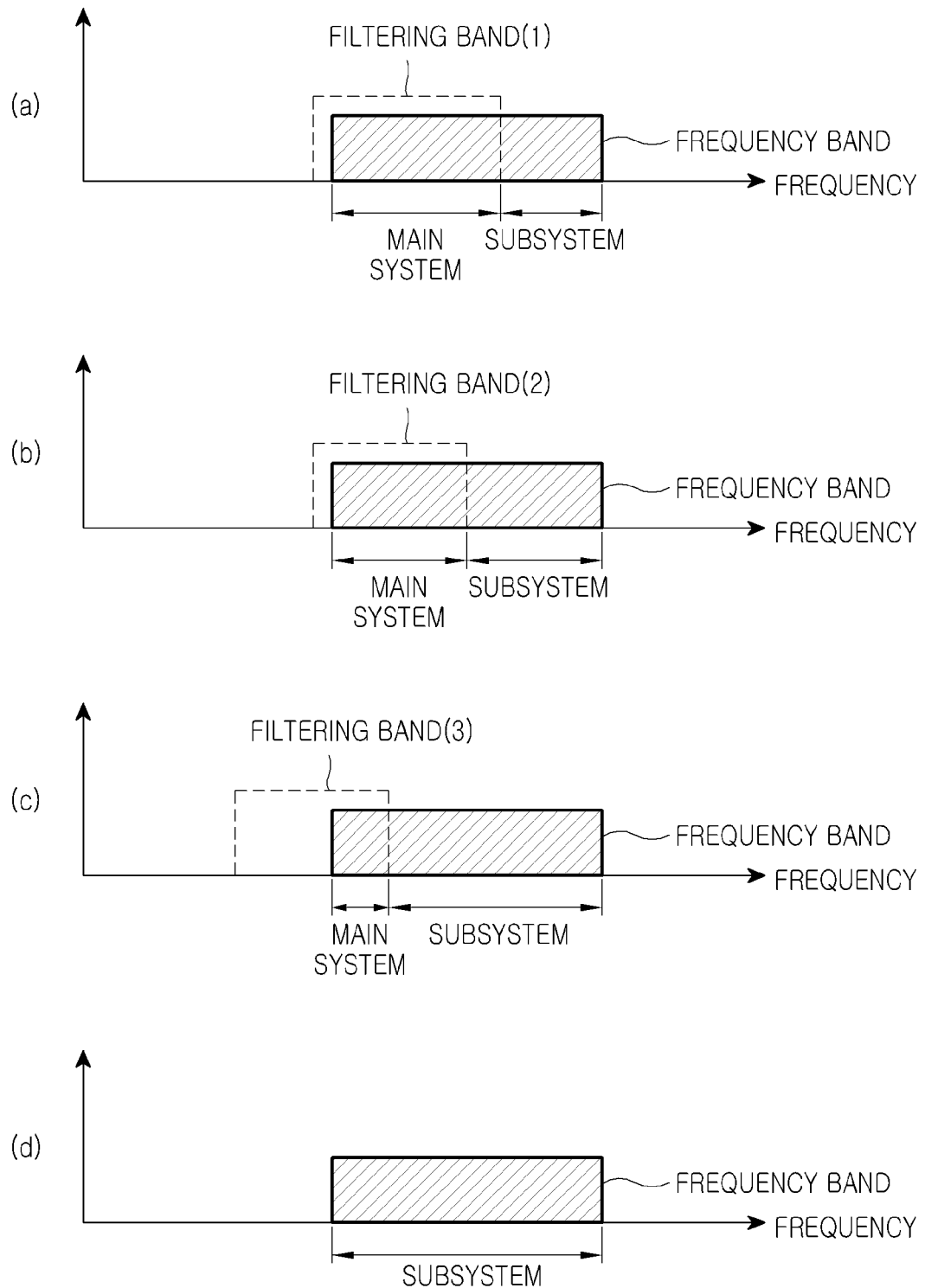

FIGS. 19A and 19B illustrate frequency band allocation and selection, when a system is added by dividing a frequency band. Referring to FIG. 19A, when only the main system is initially installed in the BS sharing apparatus, for example, the total frequency band may be filtered. In this case, a switching path has been connected to the first dual BPFs 294-1 among the plurality of dual BPFs 294-1, 294-2, 294-3 and 294-1 illustrated in FIG. 4.

If a corresponding service provider or another service provider adds the subsystem 24 and wants to provide a service through the main system 22 and the subsystem 24 by dividing the allocated service frequency band, the first and second filter units 206 and 208 may selectively set different filtering bands out of the total transmission and reception frequency bands of the main system 22 (or the subsystem from another point of view) according to an external control signal, as illustrated in FIG. 19B.

FIG. 19B (a), (b) and (c) illustrate a filtering band for each of the second, third and fourth dual BPFs 294-2, 294-3 and 294-4 and frequency allocation to the main system and the subsystem, when each dual BPF is selected.

That is, the frequency bandwidth of the main system (referred to as a first bandwidth) is shown as greater than the frequency bandwidth of the subsystem (referred to as a second bandwidth) in FIG. 19A. In FIG. 19B, the first bandwidth is depicted as narrower and the second bandwidth is depicted as wider. Accordingly, a filtering band is also to be changed through switching. In FIG. 19C, the first bandwidth is depicted as much narrower and the second bandwidth is depicted as much wider. Accordingly, the filtering band is also changed through switching. Herein, among the second, third and fourth dual BPFs 294-2, 294-3 and 294-4 illustrated in FIG. 4, the second dual BPFs 294-2 may be configured so as to have filtering band (1) illustrated in (a) of FIG. 4b. Similarly, the third and fourth dual BPFs 294-3 and 294-4 may be configured so as to respectively have filtering band (2) and filtering band (3) illustrated in (b) and (c) of FIG. 4b. Therefore, a path is connected by selecting one of the second, third and fourth dual BPFs 294-2, 294-3 and 294-4 according to a required filtering band.

FIG. 19B (d) illustrates an exemplary frequency allocation, when a path is not connected to any of the dual BPFs 294-1, 294-2 and 294-3 (that is, a connection path is blocked). In this case, the total frequency band is dedicated to the subsystem, with no frequency band allocated to the main system. A controller (not shown) may take charge of an operation for selecting one of the dual BPFs 294-1, 294-2 and 294-3 and control the switches according to a predetermined condition.

In this manner, the first and second filter units 206 and 208 are designed so as to appropriately select one of a plurality of frequency bands, not a frequency-fixed dual BPF. Therefore, they can cope appropriately when a BS system adds a subsystem to a main system by dividing a corresponding service frequency band.

As described above, since the first and second filter units 206 and 208 of the present invention are passive devices, they can be implemented with low cost and operate more stably. Compared to a case of using a single filter, filter replacement cost can be minimized and a communication disconnection being a concern involved in filter replacement can be prevented. Meanwhile, the filtering bandwidths of the first and second filter units 206 and 208 may vary depending on communication systems. For instance, the filtering bandwidths of the second, third and fourth dual BPFs 294-2, 294-3 and 294-4 may be 3.75 MHz, 2.5 MHz, and 1.25 MHz, respectively in FIG. 4.

When the first or second filter unit 205 or 208 of FIG. 2 is configured in the structure illustrated in FIG. 4, a signal input to the first or second filter unit 206 or 208 is switched to the filter bank 294 by the first or second switch 291 or 292 and then output through the other switch. Therefore, a significant signal loss is incurred while the signal passes through the first or second switch 291 or 292. In this context, another embodiment of the present invention provides a structure in which an input/output signal path is selectively connected to a required dual BPF among a plurality of dual BPFs, even without the first and second switches 291 and 292.

Figure 6:
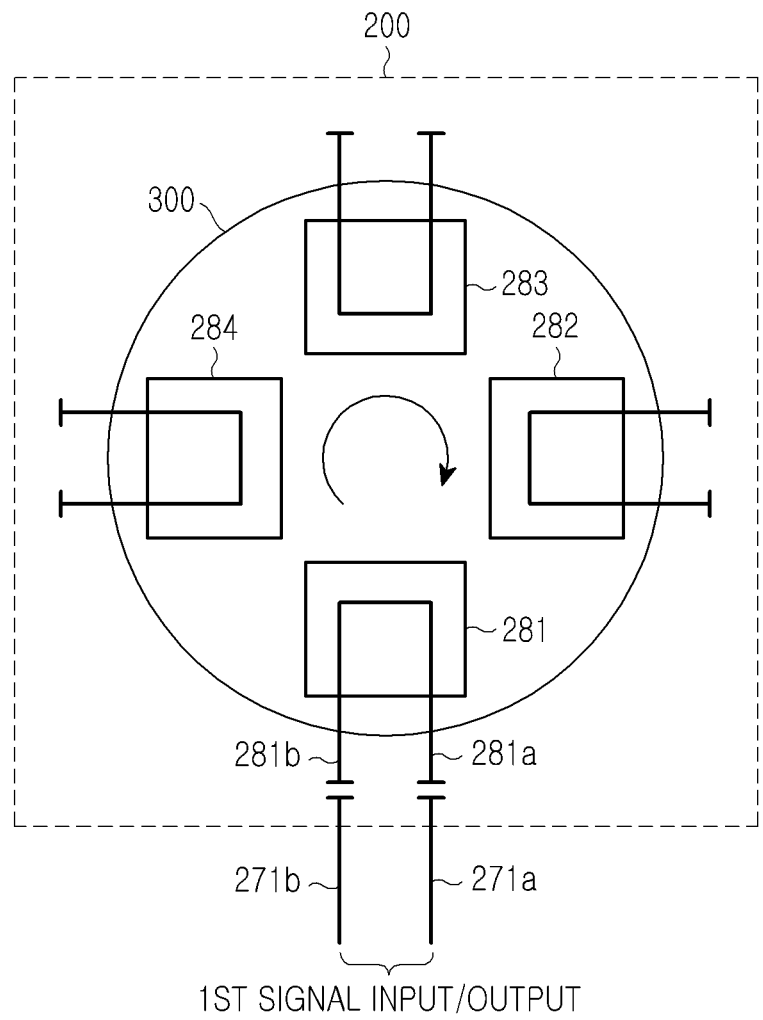
FIG. 6 is a detailed block diagram of a filter unit applicable as the first or second filter unit illustrated in FIG. 2 according to another embodiment of the present invention.
Figure 7:
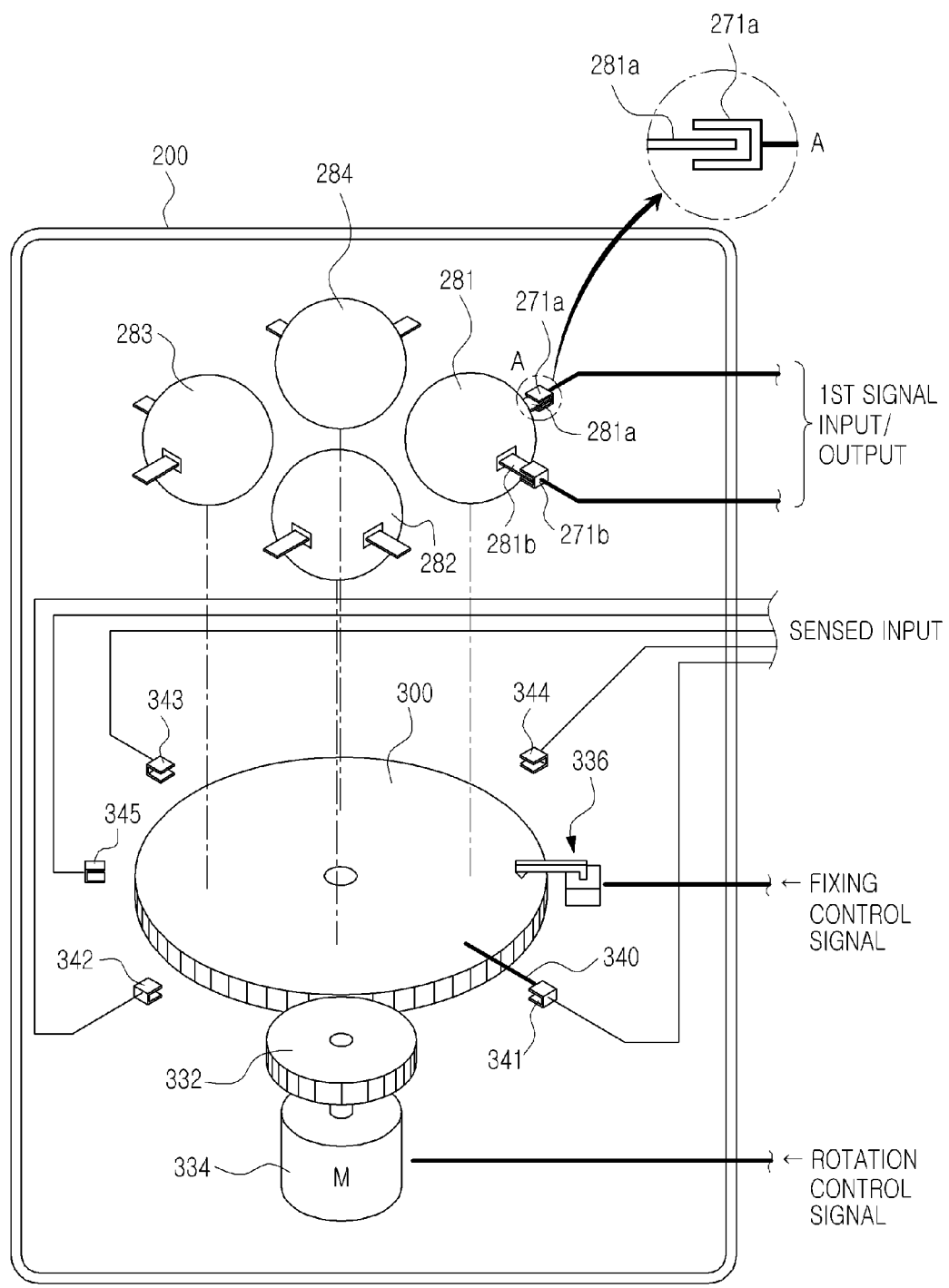
FIG. 7 is a schematic perspective view of the filter unit applicable as the first or second filter unit illustrated in FIG. 2 according to the second embodiment of the present invention.
Figure 8:
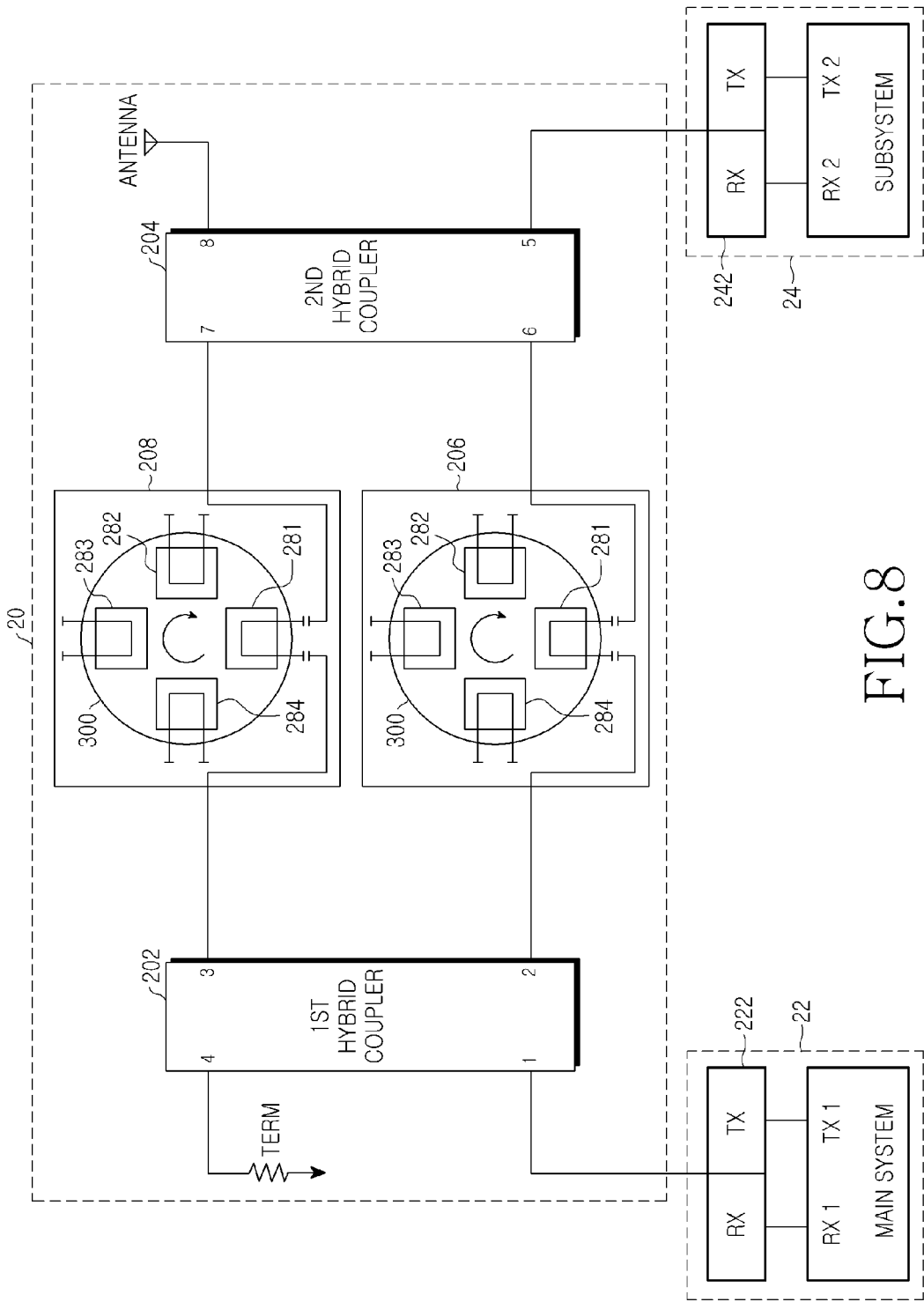
FIG. 8 is a block diagram of the wireless communication BS sharing apparatus using the filter unit illustrated in FIG. 6 according to the first embodiment of the present invention.

FIG. 6 is a detailed block diagram of a filter unit applicable as the first or second filter unit illustrated in FIG. 2 according to another embodiment of the present invention, FIG. 7 is a perspective view of the filter unit applicable as the first or second filter unit illustrated in FIG. 2 according to the embodiment of the present invention, and FIG. 8 illustrates the wireless communication BS sharing apparatus 20 having the filter unit illustrated in FIG. 6 according to the first embodiment of the present invention. Referring to FIGS. 6 and 7, the filter unit includes only a filter module 200 having a plurality of dual BPFs 281, 282, 283 and 284, without a switch structure. The plurality of filters 281, 282, 283 and 284 are installed up, down, left and right symmetrically on a rotation plate 200 that is rotatably installed. Hence, the dual BPFs 281 to 284 are rotated along with the rotation plate 300.

It is important to design the filters 281 to 284 so that the input and output ends of the filters 281 to 284 move in a perfect matching trajectory, when the rotation plate 300 rotates. While the rotation plate 200 rotates, the input and output ends of the plurality of dual BPFs 281, 282, 283 and 284 are sequentially connected to input and output connectors 271a and 271b of the filter module 200 at predetermined connection positions (i.e. positions at which the input and output connectors of the filter module 200 are installed). That is, the input and output ends of the dual BPFs 281 to 284 are designed such that when the dual BPFs 281 to 284 are at the positions where they are connected to the input and output connectors 271a and 271b of the filter module 200, the input and output ends of the dual BPFs 281 to 284 accurately correspond to the input and output connectors 271a and 271b of the filter module 200. In FIGS. 6 and 7, the input and output ends 281a and 281b of the first dual BPF 281 are shown as connected to the input and output connectors 271a and 271b of the filter module 200, respectively.

As clearly illustrated in a dash-dotted circle A in FIG. 7, the input and output ends of a dual BPF can be connected to the input and output connectors 271a and 271b of the filter module 200 in a non-contact connection structure in which signals are transferred by mutual capacitance coupling.

The rotation plate 300 on which the dual BPFs 281 to 284 are installed includes a gear structure. This gear structure rotates in interaction with a force transfer gear structure 332 connected to a driving motor 334 that is driven according to an external rotation control signal.

To sense the rotation state of the rotation plate 300, that is, the positions of the dual BPFs 281 to 284 installed on the rotation plate 300, a plurality of position sensors 341, 342, 343, 344 and 345 may be provided. Each of the position sensors 341 to 345 senses the position of a location detection pin 340 installed on the rotation plate 300 and outputs a sensed signal externally. The position sensors 341 to 345 and the location detection pin 340 are designed such that they sense that the filters 281 to 284 are located in correspondence with the input and output connectors 271a and 271b of the filter module 200.

Besides the above structure, a fixed mechanical unit 336 may be provided to press a fixing jig on the rotation plate 300 (or a groove or hole formed into the rotation plate) according to an external fixing control signal. When the rotation plate 300 is at a required appropriate position, the fixing mechanical unit 336 functions to fix the rotation plate 300 so that the rotation plate 300 is neither rotated nor vibrated by an external impact or the like.

As described above, the filter unit according to the embodiment of the present invention is configured such that without a switch structure, filters are moved to be connected to the input and output ends. Therefore, signal loss is reduced and the absence of a switch structure leads to simple and low-cost implementation.

The dual BPFs may be formed into spheres or sphere-like forms on the whole. These filters are disclosed in Korean Patent Application No. 2009-63222 filed on Jul. 10, 2009, by the present applicant (entitled "Multi-Mode Resonator" and invented by Duk-Yong KIM and Nam-Shin PARK). U.S. Provisional Application No. 61/224,523 filed on Jul. 10, 2009, and U.S. Non-Provisional application Ser. No. 12/833,195 filed on Jul. 9, 2010, correspond to the Korean Patent Application No. 2009-63222. A filter disclosed in Korean Patent Application No. 2009-63222 includes a housing having a spherical cavity, a dielectric resonator accommodated in the cavity of the housing, and at least one transmission line that connects one point on one of first, second and third axes that are independently perpendicular to one another with respect of a central point of the dielectric resonator to one point on another axis. Input and output connectors are installed to one end of the transmission line.

While the input and output ends of the dual BPFs and the input and output connectors of the filter module 200 are shown as installed at sides of the filters in the above structure, they may be installed at various positions such as up and down positions. In addition, the input and output ends of the dual BPFs may be connected to the input and output connectors of the filter module 200 in a contact manner, not in a non-contact manner.

While the filters are depicted as rotatably installed on the circular rotation plate in the above structure, they may be installed linearly so that they can make a linear movement.

Figure 9:
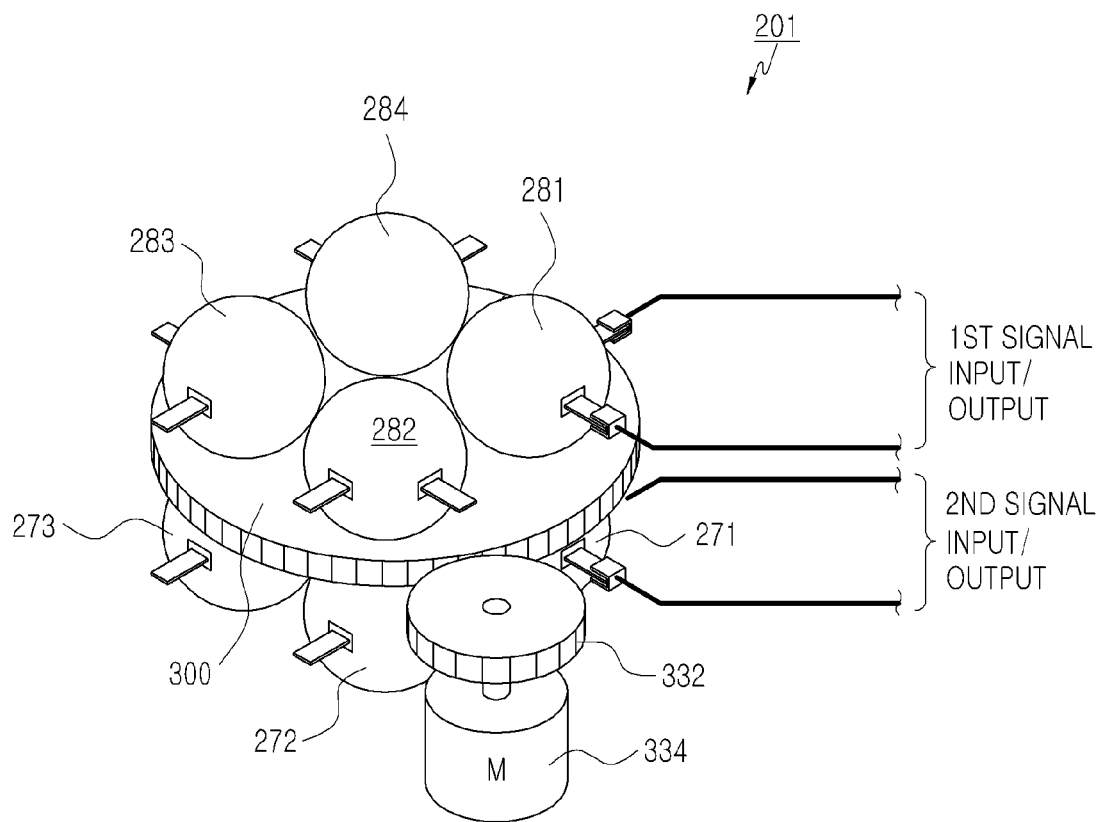
FIG. 9 is a schematic perspective view of an important part of a filter module that forms a filter unit applicable to the first and second filter units of FIG. 2 according to another embodiment of the present invention.

FIG. 9 a schematic perspective view of an important part of a filter module 201 that forms a filter unit applicable to the first and second filter units of FIG. 2 according to another embodiment of the present invention. Referring to FIG. 9, the filter module 201 is similar to the first embodiment illustrated in FIGS. 6 and 7 except that a plurality of dual BPFs 251 to 253 are installed on the bottom surface of the rotation plate 300 in addition to the plurality of dual BPFs 281 to 284 installed on the top surface of the rotation plate 300 and input and output connectors are further provided to be connected to one of the plurality of BPFs 251 to 253 installed on the bottom surface of the rotation plate 300.

In this structure, first input and output signals may be processed using a first group of the dual BPFs 281 to 284 installed on the top surface of the rotation plate 300, and at the same time, second input and output signals may be processed using a second group of the dual BPFs 251 to 253 installed on the bottom surface of the rotation plate 300. This structure may be regarded as a module into which the first and second filter units 206 and 208 illustrated in FIG. 2 are incorporated.

Figure 10:
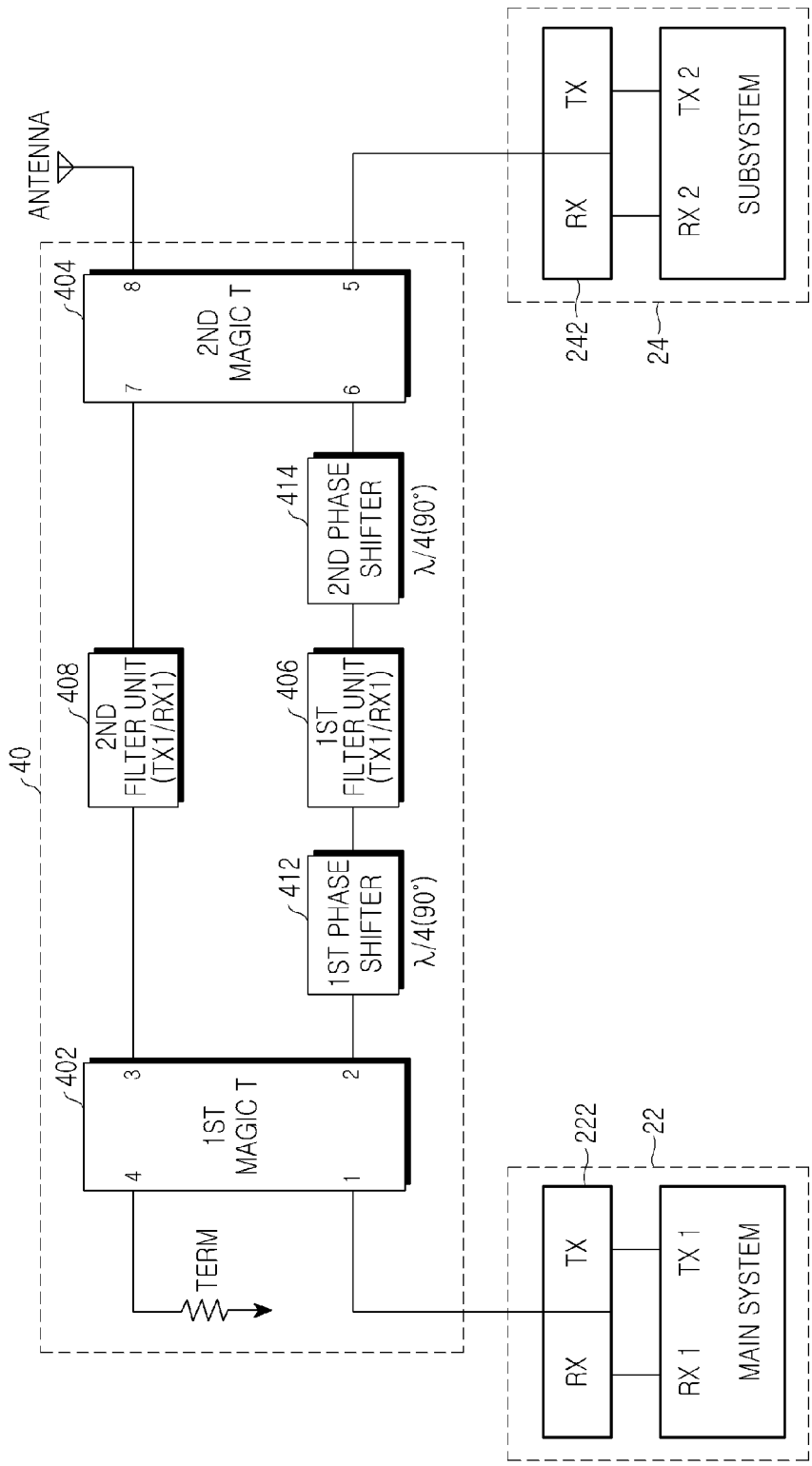
FIG. 10 is a block diagram of a wireless communication BS sharing apparatus according to another embodiment of the present invention.

FIG. 10 is a detailed block diagram of a wireless communication BS sharing apparatus according to another embodiment of the present invention. Referring to FIG. 10, a wireless communication BS sharing apparatus 40 includes a first magic T 402 for dividing a transmission signal received from the third duplexer 222 of the main system 22 through a first port so that the divided signals have different phases and outputting the divided signals with different phases, a first phase shifter 412 for receiving a signal from a second port of the first magic T 402 and shifting the phase of the received signal, a first filter unit 406 for filtering the signal received from the first phase shifter 412, a second phase shifter 414 for shifting the signal received from the first filter unit 406, a second filter unit 408 for filtering a signal received from a third port of the first magic T 402, and a second magic T 404 having a fifth port connected to the fourth duplexer 242 of the subsystem 24, for receiving the signals from the second phase shifter 414 and the second filter unit 408 through sixth and seventh ports, respectively and combining the signals.

An antenna is connected to an eighth port of the second magic T 404.

The first and second filter units 406 and 408 are configured so as to pass all or a selected part of the transmission and reception frequency bands of the main system 22.

If the main system 22 is exchanged with the subsystem 24 in position, the first and second filter units 406 and 408 may include filters for passing only the transmission and reception frequency bands of the subsystem.

The third and fourth duplexers 222 and 242 are full-band duplexers.

Operations will be described below.

Figure 11:
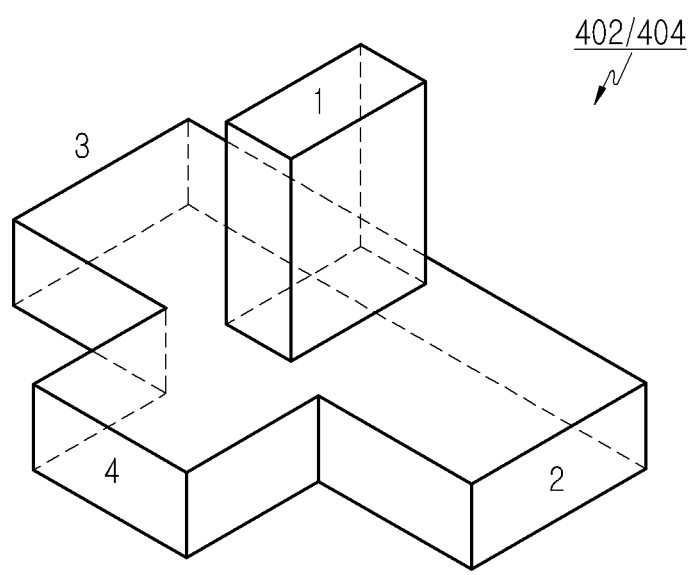
FIG. 11 is a view illustrating an operation of a magic T illustrated in FIG. 10.

With reference to FIG. 11, a basic operation of the magic Ts will be described.

A signal received through the first port is divided with a phase difference of 180 degrees and output to the second and third ports.

On the other hand, a signal received through the fourth port is divided with the same phase and output to the second and third ports.

If signals with a phase difference of 180 degrees in the same frequency are received through the second and third ports, they are combined and output through the first port. If the same-phase signals are received through the second and third ports, they are combined and output through the fourth port.

Transmission in Main System

The first magic T 402 receives the transmission signal TX1 from the third duplexer 222 of the main system 22 through the first port.

The first magic T 402 divides the received signal into two signals having a phase difference of 180 degrees and outputs the divided signals through the second and third ports.

The signal from the third port is input to the seventh port of the second magic T 404 through the second filter unit 408.

The signal from the second port is shifted by 90 degrees in the first phase shifter 412. After passing through the first filter unit 406, the signal from the first phase shifter 412 is phase-shifted by 90 degrees again in the second phase shifter 414 and then output to the sixth port of the second magic T 404.

Hence, the signals received at the second magic T 404 through the sixth and seventh ports have the same phase.

The second magic T 404 combines these signals having the same phase and outputs the combined signal through the eighth port. The signal from the eighth port is radiated through the antenna.

Reception in Main System

The second magic T 404 receives a signal from the antenna through the eighth port, divides the signal into signals having the same phase, and outputs the divided signals through the sixth and seventh ports.

The signal from the seventh port is input to the third port of the first magic T 402 through the second filter unit 408.

The signal from the sixth port of the second magic T 404 is phase-shifted by 90 degrees in the second phase shifter 414, passes through the first filter unit 406, phase-shifted again by 90 degrees in the first phase shifter 412, and then input to the second port of the first magic T 402.

Thus, the first magic T 402 receives the signals with a phase difference of 180 degrees through the second and third ports, combines them, and outputs the combined signal through the first port.

The signal from the first port is input to a receiver of the main system 22 through the third duplexer 222.

Transmission in Subsystem

The transmission signal TX2 from the subsystem 24 is input to the fifth port of the second magic T 404 through the fourth duplexer 242.

The second magic T 404 divides the received signal into signals having a phase difference of 180 degrees and outputs the divided signals to the sixth and seventh ports.

The signal from the seventh port is fully reflected from the second filter unit 408 and fed back to the seventh port.

While the signal from the sixth port is phase-shifted by 90 degrees in the second phase shifter 414, it is also fully reflected from the first filter unit 406, again phase-shifted by 90 degrees in the second phase shifter 414, and fed back to the sixth port.

Thus, the second magic T 404 receives the signals with the same phase through the sixth and seventh ports, combines them, and outputs the combined signal through the eighth port. This signal from the eighth port is radiated through the antenna.

Reception in Subsystem

The second magic T 404 receives a signal from the antenna through the eighth port, divides the received signal into signals having the same phase, and outputs the divided signals to the sixth and seventh ports.

The signal from the seventh port is fully reflected from the second filter unit 408 and fed back to the seventh port.

While the signal from the sixth port is phase-shifted by 90 degrees in the second phase shifter 414, it is also fully reflected from the first filter unit 406, again phase-shifted by 90 degrees in the second phase shifter 414, and fed back to the sixth port.

Thus, the second magic T 404 receives the signals with a phase difference of 180 degrees through the sixth and seventh ports, combines them, and outputs the combined signal through the fifth port.

This signal from the fifth port is input to the receiver of the subsystem 24 through the fourth duplexer 242.

Meanwhile, no reflection occurs theoretically during outputting the transmission signal Tx1 from the main system 22 through the first magic T 402 and thus there should be no signal output through the fourth port. In practice, however, the transmission signal Tx1 is output through the fourth port, although it is weak. To prevent this problem, the load resistor TERM is provided at the fourth port, for isolation.

The first and second filter units 406 and 408 each are configured to include the filter bank 294 and the first and second switches 291 and 292 illustrated in FIG. 4, or the filter module 200 illustrated in FIG. 6, instead of a frequency-fixed duplexer, in order to pass the whole or a selected part of the transmission and reception frequency bands of the main system 22 through switching to dual BPFs. Therefore, addition of a subsystem to a main system by dividing a corresponding service frequency band can be appropriately handled in a BS system.

Figure 12:
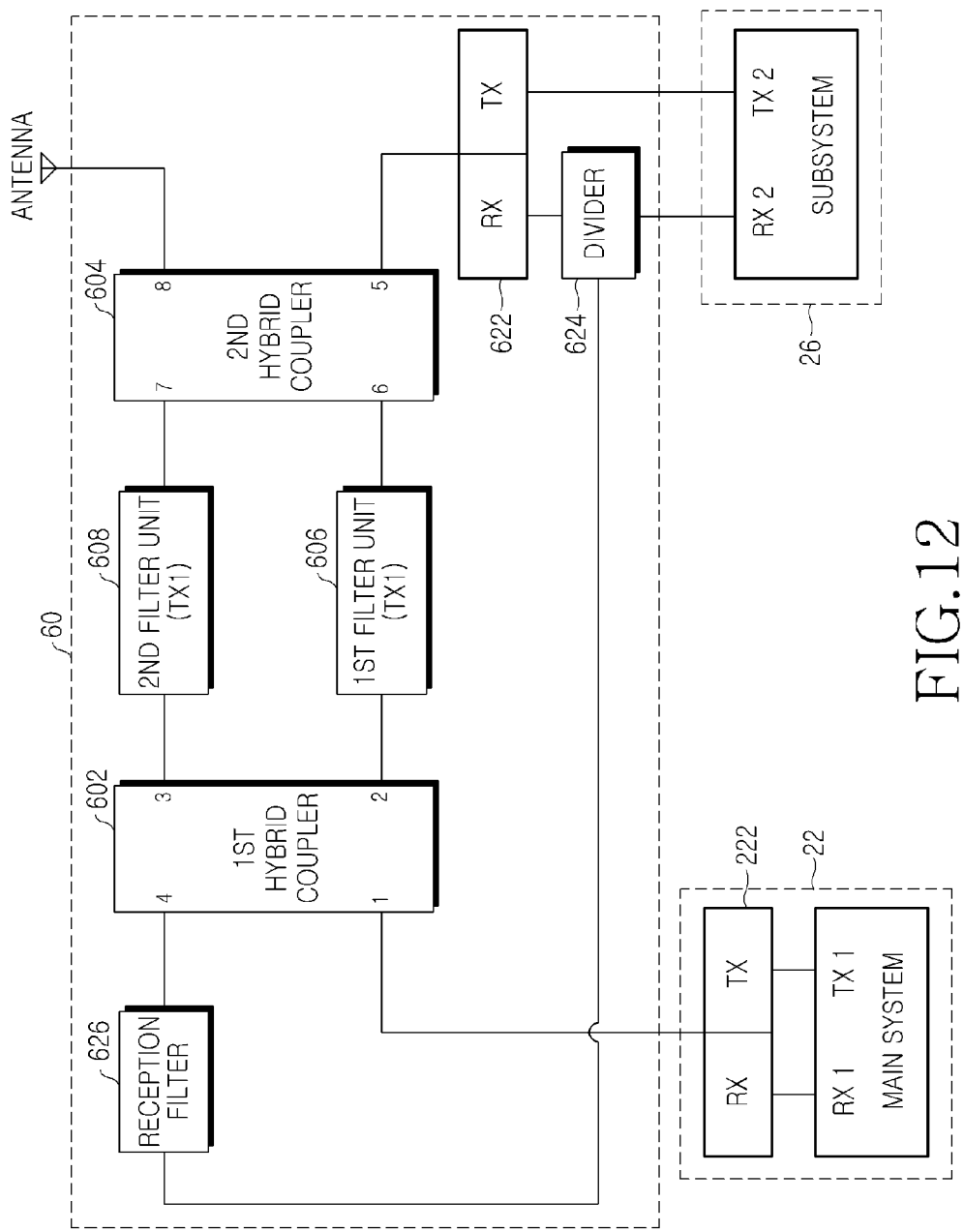
FIG. 12 is a block diagram of a wireless communication BS sharing apparatus according to a third embodiment of the present invention.

FIG. 12 is a block diagram of a wireless communication BS sharing apparatus according to a third embodiment of the present invention. Referring to FIG. 12, a wireless communication BS sharing apparatus 60 is configured so as to share an antenna between the main system 22 having the third duplexer 222 and a subsystem 26.

This BS sharing apparatus 60 includes a first hybrid coupler 602 for dividing a transmission signal received from the third duplexer 222 through a first port into signals having different phases, dividing a signal received from the antenna through a fourth port signals having different phases, and outputting the divided signals, a first filter unit 606 for filtering a signal received from a second port of the first hybrid coupler 602, a second filter unit 608 for filtering a signal received from a third port of the first hybrid coupler 602, a second hybrid coupler 604 for receiving signals from the first and second filter units 606 and 608 through sixth and seventh ports and combining the signals, a fourth duplexer 622 connected to a fifth port of the second hybrid coupler 604 and the subsystem 26, a divider 624 connected between a receiver Rx of the fourth duplexer 622 and the subsystem 26, for dividing a signal received from the receiver Rx of the fourth duplexer 622, and a reception filter 626 for filtering a divided signal received from the divider 624 and applying the filtered signal to the fourth port of the first hybrid coupler 602.

The antenna is connected to an eighth port of the second hybrid coupler 604.

The receivers Rx of the third and fourth duplexers 222 and 622, and the reception filter 626 can be configured with filters that pass both reception frequencies of the main system 22 and the subsystem 26, or full-band reception filters for passing the reception frequency band of the main system 22 and the subsystem 26 in a particular band (e.g. a PCS band).

The first and second filter units 606 and 608 are configured so as to pass all or a selected part of the transmission frequency band of the main system 22.

If the main system 22 is exchanged with the subsystem 26 in position, the first and second variable filter units 606 and 608 may include filters for passing only the transmission and reception frequency bands of the subsystem 26.

The fourth duplexer 622 may not be provided if it already exists in the subsystem 26. Needless to say, the subsystem 26 must have the divider 624 in this case.

The operations of the wireless communication BS sharing apparatus will be described below.

Transmission in Main System

Upon receipt of the transmission signal TX1 from the third duplexer 222 of the main system 22 through the first port of the first hybrid coupler 602, the first hybrid coupler 602 shifts the phase of the received signal by 90 degrees and 180 degrees and outputs the 90 degree-shifted signal and the 180 degree-shifted signal through the second and third ports, respectively. That is, the phase-shifted signals have a phase difference of 90 degrees.

The signals from the second and third ports pass through the first and second filter units 606 and 608 that pass only the transmission signal Tx1 of the main system 22 and are input to the sixth and seventh ports of the second hybrid coupler 604.

The second hybrid coupler 604 combines the signals received through the sixth and seventh ports and outputs the combined signal through the eighth port. This signal from the eighth port is radiated through the antenna.

Reception in Main System

Upon receipt of a signal from the antenna through the eighth port of the second hybrid coupler 604, the second hybrid coupler 604 shifts the phase of the received signal by 90 degrees and 180 degrees and outputs the 90 degree-shifted signal and the 180 degree-shifted signal through the seventh and sixth ports, respectively. That is, the phase-shifted signals have a phase difference of 90 degrees.

The signals from the sixth and seventh ports are fully reflected from the first and second filter units 606 and 608 and fed back to the sixth and seventh ports.

The feedback signals are combined and output through the fifth port.

The signal from the fifth port passes through the fourth duplexer 622 and divided in the divider 624.

One of the divided signals from the divider 264 is applied to the subsystem 26 and the other divided signal is input to the fourth port of the first hybrid coupler 602 through the reception filter 626.

The signal input to the fourth port is divided into signals having a phase difference between 90 degrees and then output through the second and third ports.

The signals from the second and third ports are fully reflected from the first and second filter units 606 and 608 and fed back to the second and third ports.

The signals input to the second and third ports are combined and output through the first port.

The signal from the first port is input to the main system 22 through the third duplexer 222.

Transmission in Subsystem

The transmission signal TX2 from the subsystem 26 is input to the fifth port of the second hybrid coupler 604 through the fourth duplexer 622.

The second hybrid coupler 604 shifts the received signal by 90 degrees and 180 degrees and outputs the 90 degree-shifted signal and the 180 degree-shifted signal to the sixth and seventh ports, respectively. That is, the phase-shifted signals have a phase difference of 90 degrees.

The signals from the sixth and seventh ports are fully reflected from the first and second filter units 606 and 608 and fed back to the sixth and seventh ports.

The feedback signals are combined and output through the eighth port. The signal from the eighth filter is radiated through the antenna.

Reception in Subsystem

The second hybrid coupler 608 receives a signal from the antenna through the eighth port, shifts the received signal by 90 degrees and 180 degrees, and outputs the 180 degree-shifted signal and the 90 degree-shifted signal, respectively to the sixth and seventh ports. That is, the divided signals have a phase difference of 90 degrees.

The signals from the sixth and seventh ports are fully reflected from the first and second filter units 606 and 608 and fed back to the sixth and seventh ports.

The feedback signals are combined and output through the fifth port.

The signal from the fifth port passes through the fourth duplexer 622 and is input to the receiver of the subsystem 26 through the divider 624.

Figure 14:
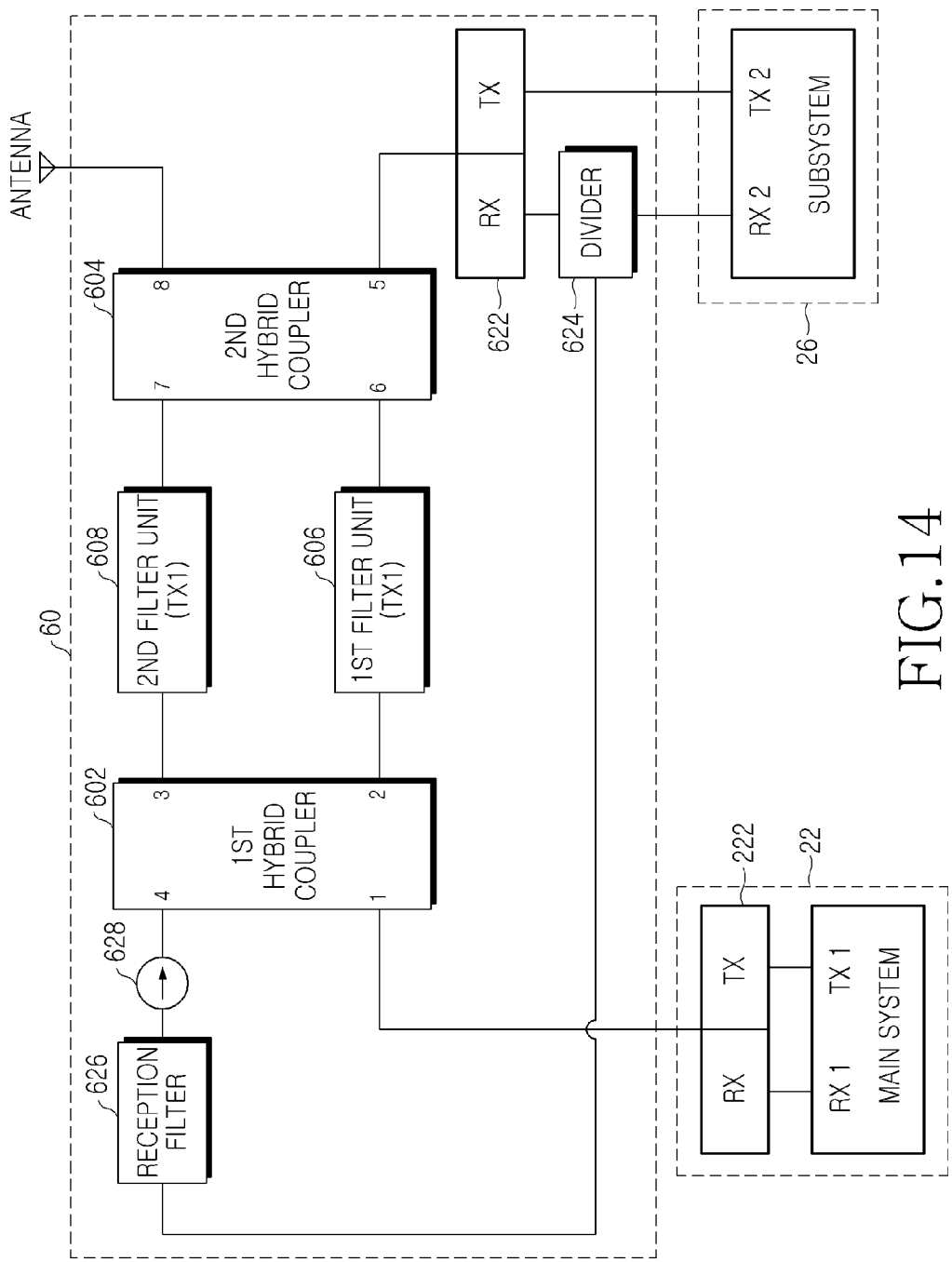
FIG. 14 is a block diagram of a wireless communication BS sharing apparatus configured by adding an isolator to the wireless communication BS sharing apparatus illustrated in FIG. 12.

Meanwhile, no reflection occurs theoretically during outputting the transmission signal Tx1 from the main system 22 through the first hybrid coupler 602 and thus there should be no signal output through the fourth port. In practice, however, the transmission signal Tx1 is output through the fourth port, although it is weak. To prevent this problem, an isolator (or circulator) 628 may be further provided between the reception filter 626 and the fourth port of the first hybrid coupler 602, for isolation, as illustrated in FIG. 14.

Figure 13:
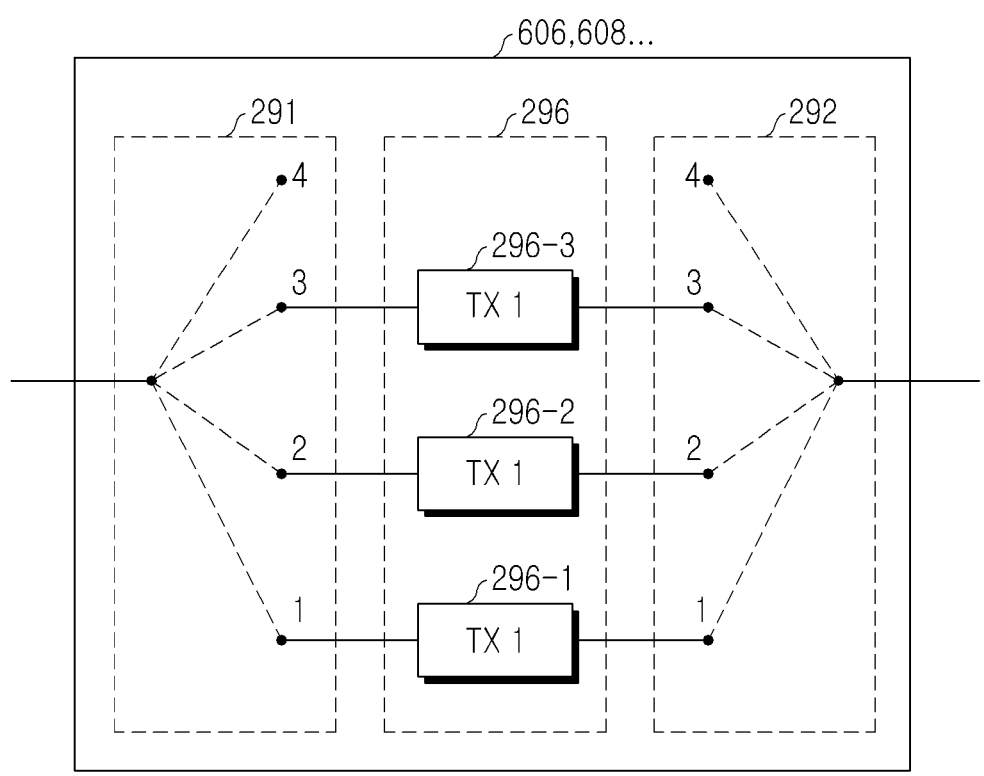
FIG. 13 is a detailed block diagram of a filter unit applicable as a first or second filter unit illustrated in FIG. 12, according to an embodiment of the present invention.

FIG. 13 is a detailed block diagram of a filter unit according to an embodiment of the present invention, which can be used as the first or second filter unit illustrated in FIG. 12. Referring to FIG. 13, the filter unit applicable as the first and second filter units 606 and 608 for passing all or a selected part of the transmission frequency band of the main system 22 includes a filter bank 296 having the plurality of (three in FIG. 13) BPFs 296-1, 296-2 and 296-3 designed to have different pass bands of the transmission frequency band of the main system 22, and the first and second switches 291 and 292 of a 1:N switching structure (a 1:4 switching structure in the embodiment of the present invention) provided respectively at the input and output ends of the filter bank 296, for switching an input/output path to one or none of the plurality of BPFs 296-1, 296-2 and 296-3 of the filter bank 294. The first and second switches 291 and 292 to switch to the same BPF among the plurality of BPFs 296-1, 296-2 and 296-3.

The thus-constituted filter unit applicable as the first or second filter unit of FIG. 12 according to the present invention is configured so as to pass the whole or selected part of the transmission frequency band of the main system 22. The reason for designing the filter unit so that one BPF having an appropriate pass band can be selected from among the plurality of BPFs, rather than a BPF having a fixed frequency band is used is to actively adapt to both a case where a transmission frequency band of a BS system is dedicated to the main system or a case where the transmission frequency band is separated for the main system and the subsystem.

That is, as illustrated in FIG. 19A, when only the main system 22 is initially installed in the BS sharing apparatus, the first and second filter units 606 and 608 can be set to filter all of a service frequency band allocated to a corresponding service provider.

If the service provider adds the subsystem 24 and wants to provide a service through the main system 22 and the subsystem 24 by dividing the allocated service frequency band, the first and second filter units 606 and 608 may selectively set different filtering bands out of the total transmission frequency band of the main system 22 (or the subsystem from another point of view) according to an external control signal, as illustrated in FIG. 19B.

Figure 15:
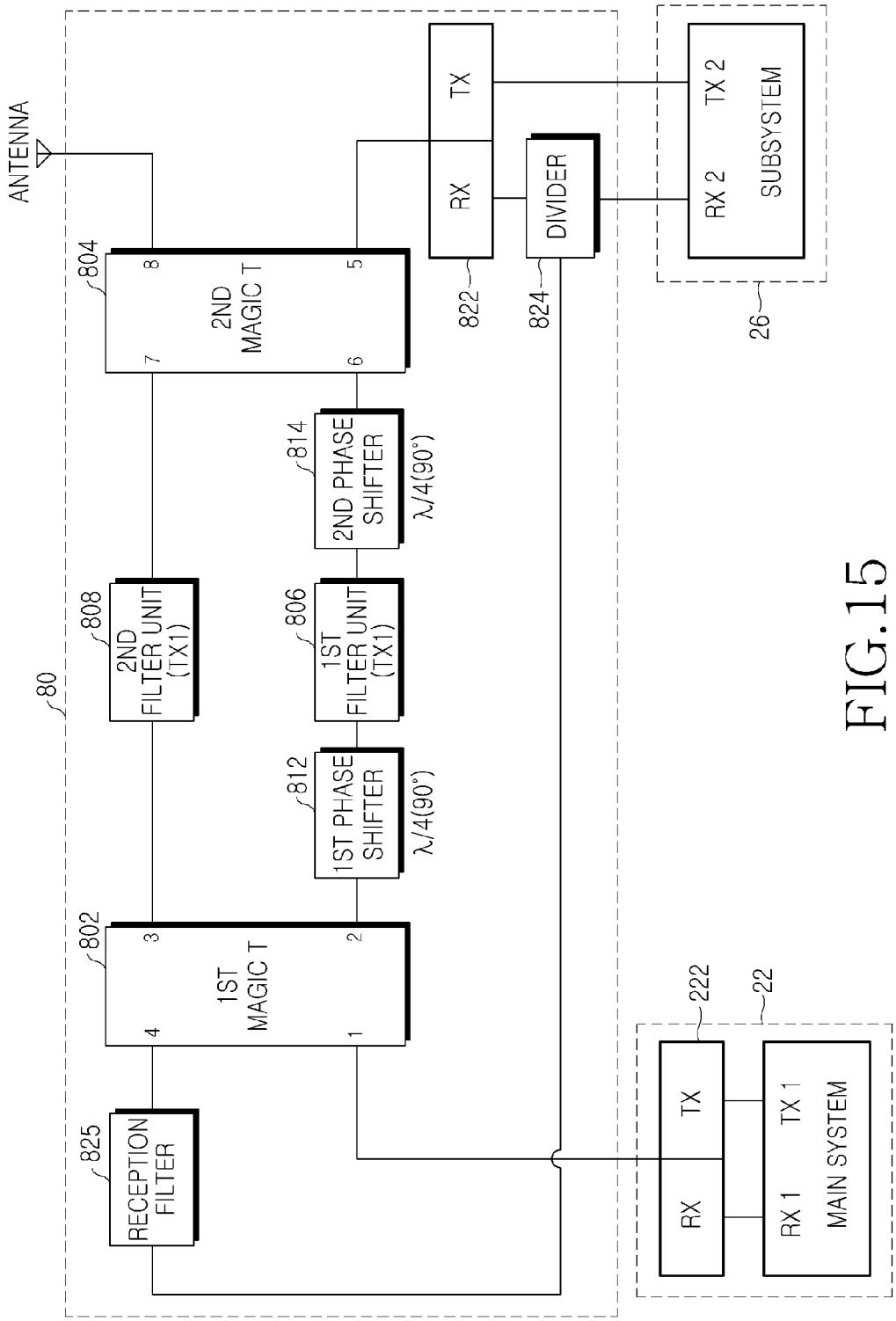
FIG. 15 is a block diagram of a wireless communication BS sharing apparatus according to a fourth embodiment of the present invention.

FIG. 15 is a detailed block diagram of a wireless communication BS sharing apparatus according to a fourth embodiment of the present invention. Referring to FIG. 15, a wireless communication BS sharing apparatus 80 is configured so as to share an antenna between the main system having the third duplexer 222 and the subsystem 26.

This BS sharing apparatus 80 includes a first magic T 802 for dividing a transmission signal received from the third duplexer 222 of the main system 22 through a first port into signals having different phases and outputting the divided signals with different phases to second and third ports, and dividing a signal received from the antenna through a fourth port into signals having the same phase and outputting the divided signals with the same phase to the second and third ports, a first phase shifter 812 for receiving the signal from the second port of the first magic T 802 and shifting the phase of the received signal, a first filter unit 806 for filtering the signal received from the first phase shifter 812, a second phase shifter 814 for shifting the signal received from the first filter unit 806, a second filter unit 808 for filtering the signal received from the third port of the first magic T 802, a second magic T 804 for receiving the signals from the second phase shifter 814 and the second filter unit 808 through sixth and seventh ports, respectively and combining the signals, a fourth duplexer 822 connected between the fifth port of the second magic T 804 and the subsystem 26, a divider 824 connected between a receiver Rx of the fourth duplexer 822 and the subsystem 26, for dividing a signal received from the receiver Rx of the fourth duplexer 822, and a reception filter 826 for filtering a divided signal received from the divider 824 and inputting the filtered signal to the fourth port of the first magic T 802.

The antenna is connected to an eighth port of the second magic T 804.

The receivers Rx of the third and fourth duplexers 222 and 822 and the reception filter 826 can be configured with reception filters that pass both reception frequencies of the main system 22 and the subsystem 26, or filters for passing the reception frequency band of the main system 22 and the subsystem 26 in a particular band (e.g. a PCS band).

The first and second filter units 806 and 808 are configured so as to pass all or a selected part of the transmission frequency band of the main system 22.

If the main system 22 is exchanged with the subsystem 26 in position, the first and second variable filter units 806 and 808 may include filters for passing only the transmission and reception frequency bands of the subsystem 26.

The fourth duplexer 822 may not be provided if it already exists in the subsystem 26.

The operations of the wireless communication BS sharing apparatus will be described below.

Transmission in Main System

The first magic T 802 receives the transmission signal TX1 from the third duplexer 222 of the main system 22 through the first port.

The first magic T 802 divides the received signal into two signals having a phase difference of 180 degrees and outputs the divided signals through the second and third ports.

The signal from the third port is input to the seventh port of the second magic T 804 through the second filter unit 808.

The signal from the second port is shifted by 90 degrees in the first phase shifter 812. After passing through the first filter unit 806, the signal from the first phase shifter 812 is phase-shifted by 90 degrees again in the second phase shifter 814 and then output to the sixth port of the second magic T 804.

Hence, the signals received at the second magic T 804 through the sixth and seventh ports have the same phase.

The second magic T 804 combines these signals having the same phase and outputs the combined signal through the eighth port. The signal from the eighth port is radiated through the antenna.

Reception in Main System

The second magic T 804 receives a signal from the antenna through the eighth port, divides the signal into signals having the same phase, and outputs the divided signals through the sixth and seventh ports.

The signal from the seventh port is fully reflected from the second filter unit 808 and fed back to the seventh port.

While the signal from the sixth port is phase-shifted by 90 degrees in the second phase shifter 814, it is also fully reflected from the first filter unit 806, again phase-shifted by 90 degrees in the second phase shifter 814; that is, by 180 degrees in total and fed back to the sixth port.

Thus, the second magic T 804 receives the signals with a phase difference of 180 degrees through the sixth and seventh ports, combines them, and outputs the combined signal through the fifth port.

The signal from the fifth port passes through the fourth duplexer 822 and is divided into two signals in the divider 824.

One of the divided signals from the divider 824 is input to the subsystem 26 and the other divided signal is input to the fourth port of the first magic T 802 through the reception filter 826.

The first magic T 802 divides the signal received through the fourth port into signals having the same phase and outputs the divided signals to the second and third ports.

The signal from the third port is fully reflected from the second filter unit 808 and fed back to the third port.

Although the signal from the second port is phase-shifted by 90 degrees in the first phase shifter 812, it is also reflected from the first filter unit 806, phase-shifted again by 90 degrees in the first phase shifter 812, and then input to the second port of the first magic T 802.

Thus, the first magic T 802 receives the signals with a phase difference of 180 degrees through the second and third ports, combines them, and outputs the combined signal through the first port.

The signal from the first port is input to the receiver of the main system 22 through the third duplexer 222.

Transmission in Subsystem

The transmission signal TX2 from the subsystem 26 is input to the fifth port of the second magic T 804 through the fourth duplexer 822.

The second magic T 804 divides the received signal into signals having a phase difference of 180 degrees and outputs the divided signals to the sixth and seventh ports.

The signal from the seventh port is fully reflected from the second filter unit 808 and fed back to the seventh port.

While the signal from the sixth port is phase-shifted by 90 degrees in the second phase shifter 814, it is also fully reflected from the first filter unit 806, again phase-shifted by 90 degrees in the second phase shifter 814, and fed back to the sixth port.

Thus, the second magic T 804 receives the signals with the same phase through the sixth and seventh ports, combines them, and outputs the combined signal through the eighth port. This signal from the eighth port is radiated through the antenna.

Reception in Subsystem

The second magic T 804 receives a signal from the antenna through the eighth port, divides the received signal into signals having the same phase, and outputs the divided signals to the sixth and seventh ports.

The signal from the seventh port is fully reflected from the second filter unit 808 and fed back to the seventh port.

While the signal from the sixth port is phase-shifted by 90 degrees in the second phase shifter 814, it is also fully reflected from the first filter unit 806, again phase-shifted by 90 degrees in the second phase shifter 814, and fed back to the sixth port.

Thus, the second magic T 804 receives the signals with a phase difference of 180 degrees through the sixth and seventh ports, combines them, and outputs the combined signal through the fifth port.

This signal from the fifth port is input to the divider 824 through the fourth duplexer 822. The divider 824 divides the received signal into two signals and outputs one of the two divided signals to the receiver of the subsystem 26.

Figure 16:
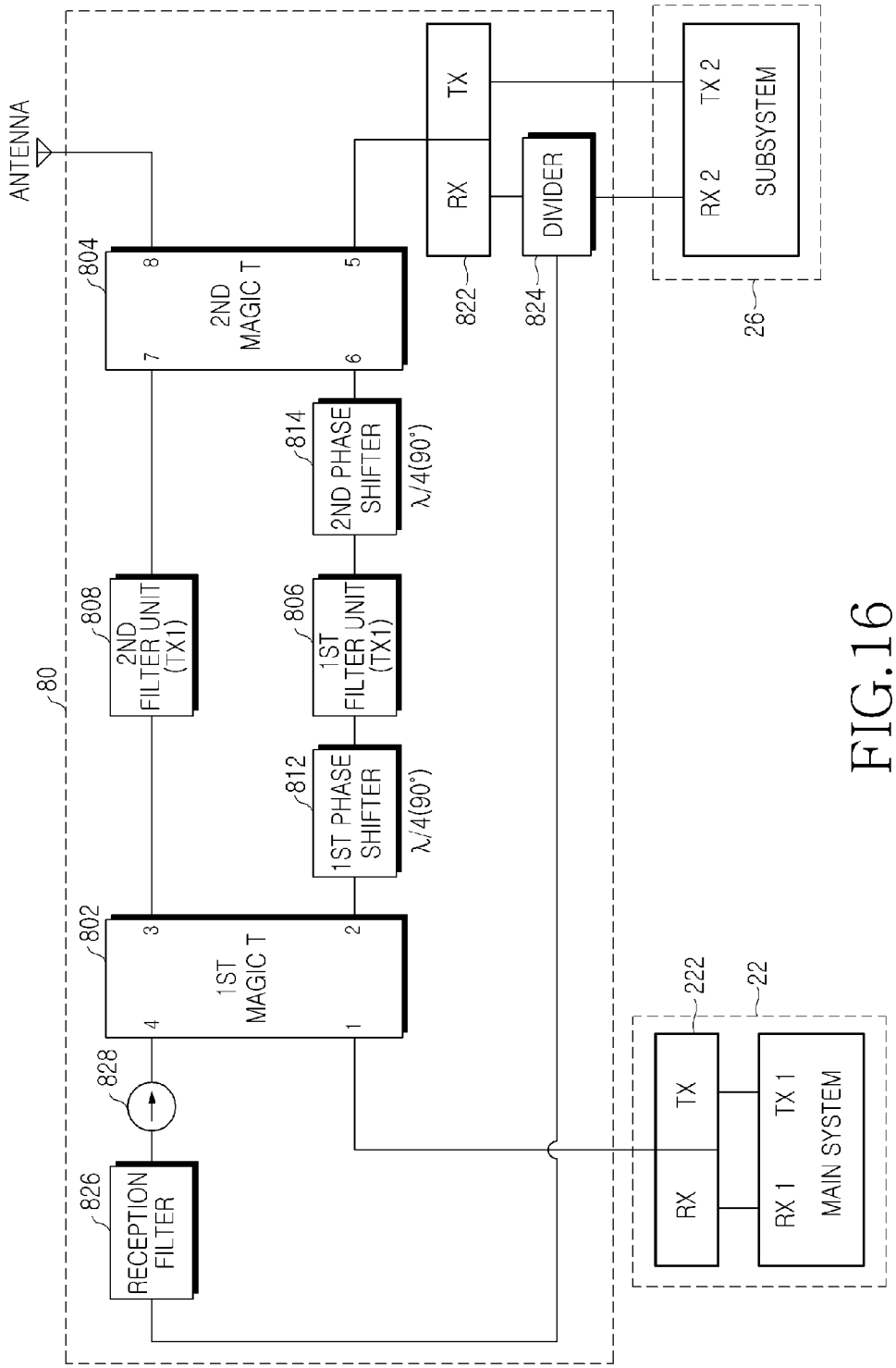
FIG. 16 is a block diagram of a wireless communication BS sharing apparatus configured by adding an isolator to the wireless communication BS sharing apparatus illustrated in FIG. 15.

Meanwhile, no reflection occurs theoretically during outputting the transmission signal Tx1 from the main system 22 through the first magic T 802 and thus there should be no signal output through the fourth port. In practice, however, some of the transmission signal Tx1 is output through the fourth port, although it is weak. To prevent this problem, an isolator 828 may be further provided between the reception filter 826 and the fourth port of the first magic T 802, for isolation, as illustrated in FIG. 16.

The first and second filter units 806 and 808 each are configured to include the filter bank 296 and the first and second switches 291 and 292 illustrated in FIG. 13, instead of a frequency-fixed filter, in order to pass the whole or a selected part of the transmission and reception frequency bands of the main system 22. Therefore, the use of the first and second filter units 806 and 808 enables addition of a subsystem to a main system through frequency band division.

Figure 17:
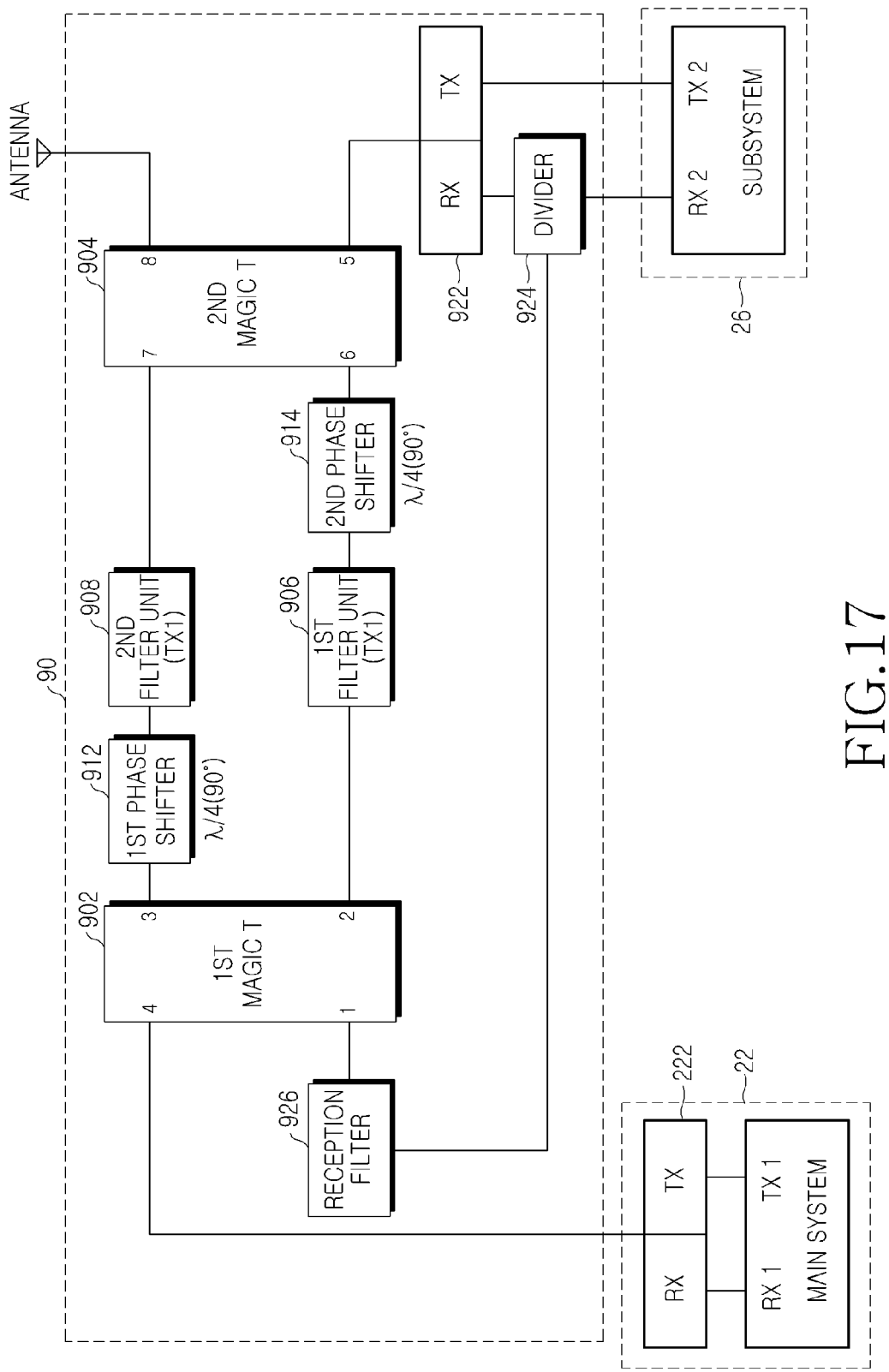
FIG. 17 is a block diagram of a wireless communication BS sharing apparatus according to a fifth embodiment of the present invention.

FIG. 17 is a block diagram of a wireless communication BS sharing apparatus according to a fifth embodiment of the present invention. Referring to FIG. 17, a wireless communication BS sharing apparatus 90 is configured so as to share an antenna between the main system 22 having the third duplexer 222 and the subsystem 26.

The BS sharing apparatus 90 includes a first magic T 902 for dividing a transmission signal received from the third duplexer 222 through a fourth port into signals having the same phase and outputting the divided signals to second and third ports, and dividing a signal received through a first port into signals having different phases and outputting the divided signals, a first phase shifter 912 for receiving the signal from the third port of the first magic T 902 and shifting the phase of the received signal, a second filter unit 908 for filtering the signal received from the first phase shifter 912, a first filter unit 906 for filtering the signal received from the second port of the first magic T 902, a second phase shifter 914 for shifting the phase of the signal received from the first filter unit 906, a second magic T 904 for receiving the signals from the second phase shifter 914 and the second filter unit 908 through sixth and seventh ports, respectively and combining the signals, a fourth duplexer 922 connected between a fifth port of the second magic T 904 and the subsystem 26, a divider 924 connected between a receiver Rx of the fourth duplexer 922 and the subsystem 26, for dividing a signal received from the receiver Rx of the fourth duplexer 922, and a reception filter 926 for filtering a divided signal received from the divider 924 and applying the filtered signal to the first port of the first magic T 902.

The antenna is connected to an eighth port of the second magic T 904.

The receivers Rx of the third and fourth duplexers 222 and 922, and the reception filter 926 can be configured with reception filters that pass both reception frequencies of the main system 22 and the subsystem 26, or full-band filters that pass the reception frequency bands of the main system 22 and the subsystem 26 in a particular band (e.g. a PCS band).

The first and second filter units 906 and 908 pass all or a selected part of the transmission frequency band of the main system 22.

If the main system 22 is exchanged with the subsystem 26 in position, the first and second filter units 906 and 908 may pass only the transmission frequency band of the subsystem 26.

If a filter such as the fourth duplexer 922 already exists in the subsystem 26, the fourth duplexer 922 may not be provided.

The operations of the wireless communication BS sharing apparatus will be described below.

Transmission in Main System

The transmission signal TX1 from the main system 22 is input to the fourth port of the first magic T 902 through the third duplexer 222.

The first magic T 902 divides the received signal into two signals having the same phase and outputs the divided signals to the second and third ports.

The signal from the third port is phase-shifted by 90 degrees in the first phase shifter 912 and input to the seventh port of the second magic T 904 through the second filter unit 908.

After passing through the first filter unit 906, the signal from the second port is phase-shifted by 90 degrees in the second phase shifter 914 and then input to the sixth port of the second magic T 904.

Hence, the signals received in the second magic T 904 through the sixth and seventh ports have the same phase.

The second magic T 904 combines these signals having the same phase and outputs the combined signal through the eighth port. The signal from the eighth port is radiated through the antenna.

Reception in Main System

The second magic T 904 receives a signal from the antenna through the eighth port, divides the received signal into signals having the same phase, and outputs the divided signals to the sixth and seventh ports.

The signal from the seventh port is fully reflected from the second filter unit 908 and fed back to the seventh port.

The signal from the sixth port of the second magic T 904 is phase-shifted by 90 degrees in the second phase shifter 914, reflected from the first filter unit 906, phase-shifted again by 90 degrees in the second phase shifter 914, thus phase-shifted by 180 degrees in total, and then input to the sixth port of the second magic T 904.

Thus, the second magic T 904 receives the signals with a phase difference of 180 degrees through the sixth and seventh ports, combines them, and outputs the combined signal through the fifth port.

The signal from the fifth port passes through the fourth duplexer 922 and is divided into two signals in the divider 924.

One of the divided signals is input to the subsystem 26 and the other divided signal is input to the first port of the first magic T 902 through the reception filter 926.

The first magic T 902 divides the signal received through the first port into signals having a phase difference of 180 degrees and outputs the divided signals to the second and third ports.

The signal from the second port is fully reflected from the first filter unit 906 and fed back to the second port.

Although the signal from the third port is phase-shifted by 90 degrees in the first phase shifter 912, it is also reflected from the first variable filter unit 906, phase-shifted again by 90 degrees in the first phase shifter 912, and then input to the second port of the first magic T 902.

Thus, the first magic T 902 receives the signals with the same phase through the second and third ports, combines them, and outputs the combined signal through the fourth port.

The signal from the fourth port passes is input to the receiver of the main system 22 through the third duplexer 222.

Transmission in Subsystem

The transmission signal TX2 from the subsystem 26 is input to the fifth port of the second magic T 904 through the fourth duplexer 922.

The second magic T 904 divides the received signal into signals having a phase difference of 180 degrees and outputs the divided signals to the sixth and seventh ports.

The signal from the seventh port is fully reflected from the second filter unit 908 and fed back to the seventh port.

While the signal from the sixth port is phase-shifted by 90 degrees in the second phase shifter 914, it is also fully reflected from the first filter unit 906, phase-shifted again by 90 degrees in the second phase shifter 914, and fed back to the sixth port.

Thus, the second magic T 904 receives the signals with the same phase through the sixth and seventh ports, combines them, and outputs the combined signal through the eighth port. This signal from the eighth port is radiated through the antenna.

Reception in Subsystem

The second magic T 904 receives a signal from the antenna through the eighth port and divides the received signal into signals having the same phase and outputs the divided signals to the sixth and seventh ports.

The signal from the seventh port is fully reflected from the second filter unit 908 and fed back to the seventh port.

While the signal from the sixth port is phase-shifted by 90 degrees in the second phase shifter 914, it is also fully reflected from the first filter unit 906, phase-shifted by 90 degrees again in the second phase shifter 914, and fed back to the sixth port.

Thus, the second magic T 904 receives the signals with a phase difference of 180 degrees through the sixth and seventh ports, combines them, and outputs the combined signal through the fifth port.

This signal from the fifth port is provided to the divider 924 through the fourth duplexer 922. The divider 924 dividers the received signal into two signals and outputs one of the two divided signals to the receiver of the subsystem 26.

Figure 18:
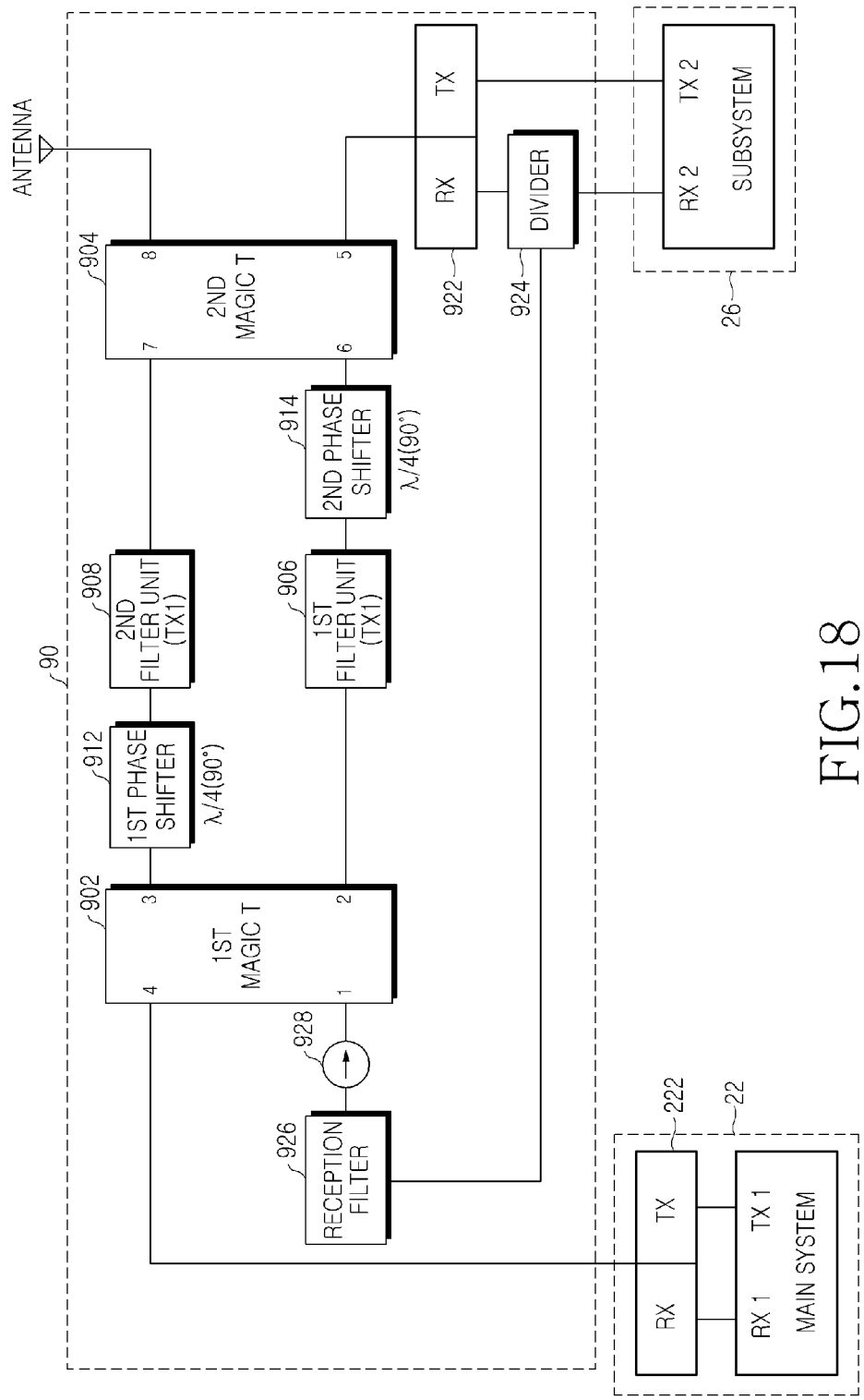
FIG. 18 is a block diagram of a wireless communication BS sharing apparatus configured by adding an isolator to the wireless communication BS sharing apparatus illustrated in FIG. 17.

Meanwhile, no reflection occurs theoretically during outputting the transmission signal Tx1 of the main system 22 through the first magic T 902 and thus there should be no signal output through the first port. In practice, however, the transmission signal Tx1 is output through the first port, although it is weak. To prevent this problem, an isolator 928 may be further provided between the reception filter 926 and the first port of the first magic T 902, for isolation, as illustrated in FIG. 18.

The first and second filter units 906 and 908 each are configured to include the filter bank 296 and the first and second switches 291 and 292 illustrated in FIG. 13, instead of a frequency-fixed filter, in order to pass the whole or a selected part of the transmission and reception frequency bands of the main system 22. Therefore, the use of the first and second filter units 806 and 808 enables addition of a subsystem to a main system through frequency band division.

Figure 20:
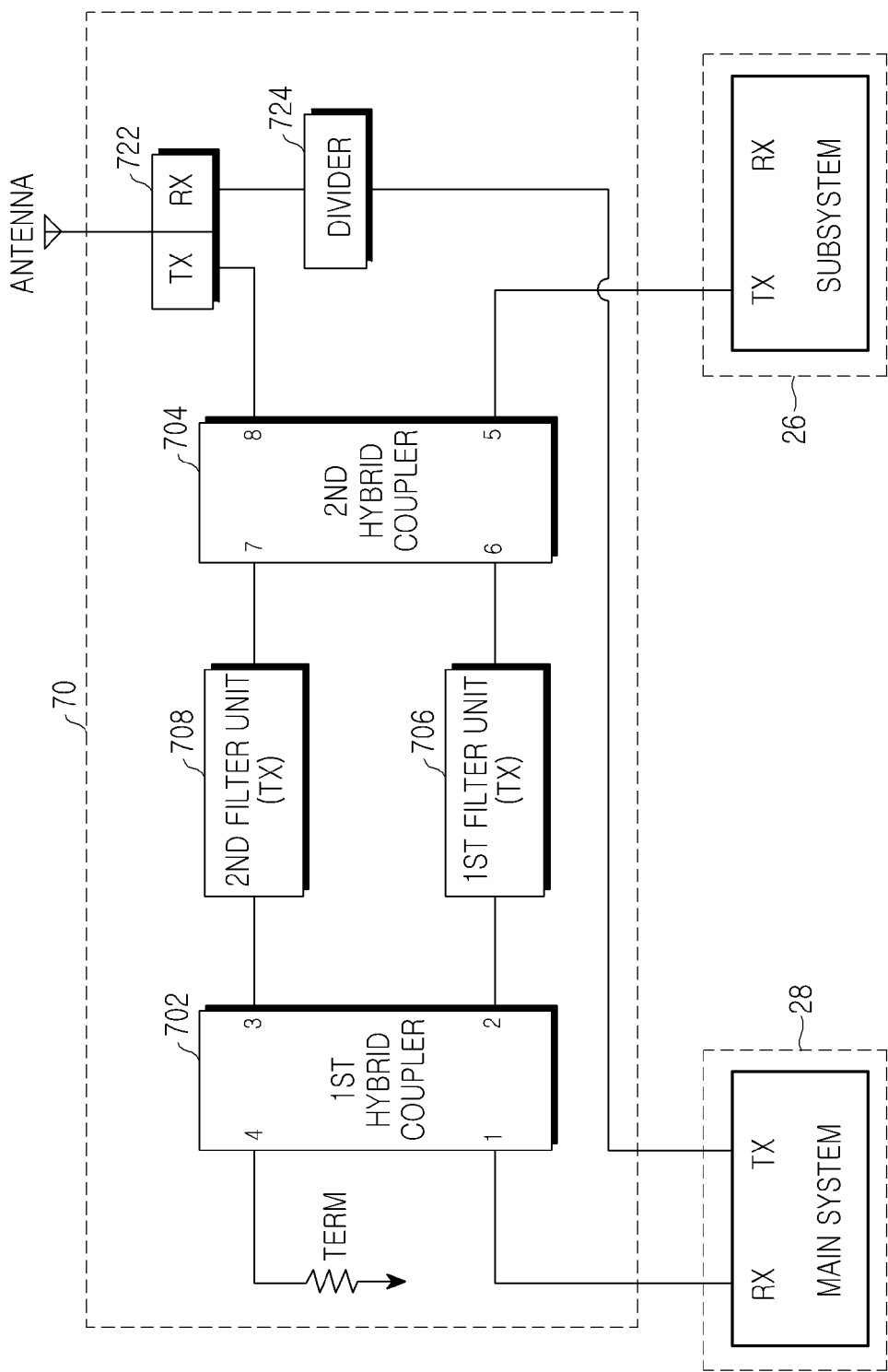
FIG. 20 is a block diagram of a wireless communication BS sharing apparatus according to a sixth embodiment of the present invention.

FIG. 20 is a block diagram of a wireless communication BS sharing apparatus according to a sixth embodiment of the present invention. The wireless communication BS sharing apparatus illustrated in FIG. 20 may not have a duplexer in either a main system 28 or the subsystem 26. Since the service frequency band of a BS system is separated and allocated to the main system 28 and the subsystem 26 according to the present invention, the basic service frequency band is common to the main system 28 and the subsystem 26.

Referring to FIG. 20, a wireless communication BS sharing apparatus 70 is configured so as to share an antenna between the main system 28 and the subsystem 26.

This BS sharing apparatus 70 includes a first hybrid coupler 702 for dividing a transmission signal received from the main system 28 through a first port into signals having different phases, a first filter unit 706 for filtering a signal received from a second port of the first hybrid coupler 702, a second filter unit 708 for filtering a signal received from a third port of the first hybrid coupler 702, a second hybrid coupler 704 for receiving signals from the first and second filter units 706 and 708 through sixth and seventh ports, combining the signals, outputting the combined signal through an eighth port, and receiving a transmission signal from the subsystem 26 through a fifth port, a duplexer 722 having a transmitter Tx connected to the eighth port of the second hybrid coupler 704, for transmitting a transmission signal from the transmitter Tx to an antenna, and a divider 724 for dividing a signal received from a receiver Rx of the duplexer 722 and outputting the divided signals to the main system 28 and the subsystem 26.

The operations of the wireless communication BS sharing apparatus will be described below.

Transmission in Main System

The first hybrid coupler 702 receives a transmission signal Tx from the main system 28 through the first port, shifts the phase of the received signal by 90 degrees and 180 degrees, and outputs the 90 degree-shifted signal and the 180 degree-shifted signal respectively to the second and third ports. That is, the phase-shifted signals have a phase difference of 90 degrees.

The signals from the second and third ports pass through the first and second filter units 706 and 708 that pass only the transmission signal Tx of the main system 28 and are input to the sixth and seventh ports of the second hybrid coupler 704.

The second hybrid coupler 704 combines the received signals and outputs the combined signal to the duplexer 722 through the eighth port. A signal from the duplexer 722 is radiated through the antenna.

Reception in Main System

A signal received through the antenna is filtered in the receiver Rx of the duplexer 722. The divider 724 divides the filtered signal and outputs one of the divided signals to the subsystem 26 and the other divided signal to the main system 28.

Transmission in Subsystem

A transmission signal Tx from the subsystem 26 is input to the second hybrid coupler 704 through the fifth port.

The second hybrid coupler 704 shifts the received signal by 90 degrees and 180 degrees and outputs the 90 degree-shifted signal and the 180 degree-shifted signal respectively to the sixth and seventh ports. That is, the phase-shifted signals have a phase difference of 90 degrees.

The signals from the sixth and seventh ports are fully reflected from the first and second filter units 706 and 708 and fed back to the sixth and seventh ports.

The feedback signals are combined and output through the eighth port. The signal from the eighth filter is radiated through the antenna after passing through the duplexer 722.

Reception in Subsystem

A signal received through the antenna is filtered in the receiver Rx of the duplexer 722. The divider 724 divides the filtered signal and outputs one of the divided signals to the subsystem 26.

Figure 21:
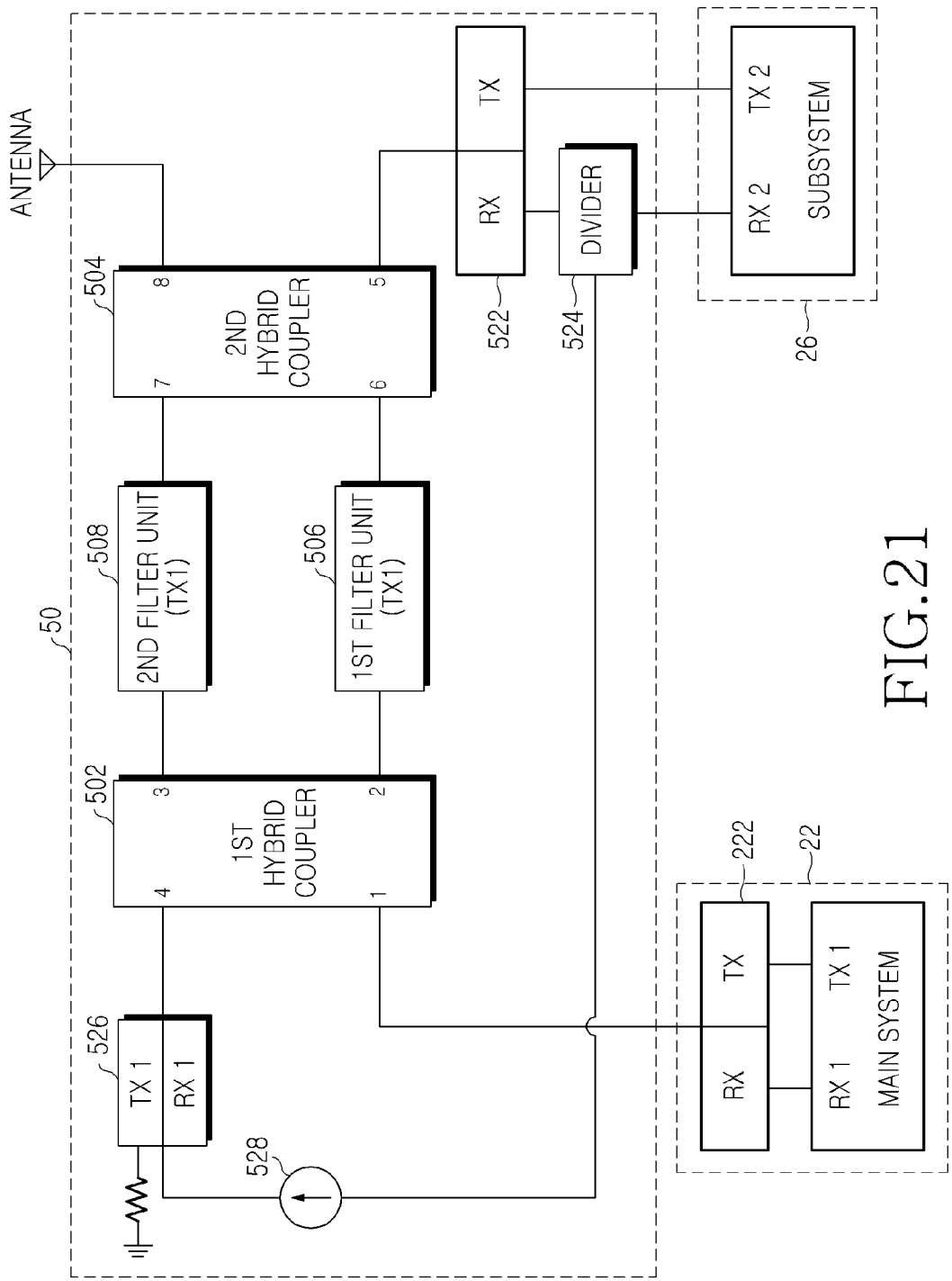
FIG. 21 is a block diagram of a wireless communication BS sharing apparatus according to a seventh embodiment of the present invention.

FIG. 21 is a block diagram of a wireless communication BS sharing apparatus according to a seventh embodiment of the present invention. Referring to FIG. 21, a wireless communication BS sharing apparatus 50 is configured so as to share an antenna between the main system 22 and the subsystem 26.

This BS sharing apparatus 50 includes a first hybrid coupler 502 for dividing a transmission signal received from the third duplexer 222 through a first port into signals having different phases and dividing a signal received from an antenna through a fourth port into signals having different phases, a first filter unit 506 for filtering a signal received from a second port of the first hybrid coupler 502, a second filter unit 508 for filtering a signal received from a third port of the first hybrid coupler 502, a second hybrid coupler 504 for receiving signals from the first and second filter units 506 and 508 through sixth and seventh ports, combining the signals, outputting the combined, a fourth duplexer 522 connected to the fifth port of the second hybrid coupler 504 and the subsystem 26, a divider 524 connected between a receiver Rx of the fourth duplexer 522 and the subsystem 26, for dividing a signal received from the receiver Rx of the fourth duplexer 522, and a duplexer 526 for filtering a divided signal received from the divider 524, outputting the filtered signal to the fourth port of the first hybrid coupler 502, receiving a transmission signal Tx1 from the fourth port although it is weak, and providing the received transmission signal Tx1 as a load resistance to the duplexer 526.

An isolator 528 may be further installed between the divider 524 and the reception filter 526, for isolation.

The antenna is connected to the eighth port of the second hybrid coupler 504.

The receivers Rx of the third and fourth duplexers 222 and 522, and the reception filter 526 can be configured with filters that pass both reception frequencies of the main system 22 and the subsystem 26, or full-band reception filters for passing the reception frequency band of the main system 22 and the subsystem 26 in a particular band (e.g. a PCS band).

The first and second filter units 506 and 508 are configured so as to pass all or a selected part of the transmission frequency band of the main system 22.

If the main system 22 is exchanged with the subsystem 26 in position, the first and second variable filter units 506 and 508 may include filters for passing only the transmission and reception frequency bands of the subsystem 26.

The fourth duplexer 522 may not be provided if it already exists in the subsystem 26. Needless to say, the subsystem 26 must have the divider 524 in this case.

The thus-constituted wireless communication BS sharing apparatus 50 according to the seventh embodiment of the present invention are almost the same in configuration and operation as the embodiments illustrated in FIGS. 12 and 13, except that the duplexer 526 is provided instead of a reception filter to additionally process the transmission signal Tx1 output from the fourth port although it is weak and the isolator 528 is installed between the divider 524 and the duplexer 526.

While the invention has been shown and described with reference to certain preferred embodiments thereof, they are merely exemplary applications. Thus many modifications can be made within the scope and spirit of the present invention.

For example, while duplexers or band-pass filters are used for selective filtering of a transmission and/or reception frequency band in the above description, they can be replaced with Low Pass Filters (LPFs) and/or High Pass Filters (HPFs), or their combinations.

While for the purpose of increasing filtering performance, the BS sharing apparatuses illustrated in FIGS. 12 to 18 are configured so that the dividers 624, 824, 924 are connected between the receivers Rx of the fourth duplexers 622, 822 and 922 and the subsystem 26, divide a signal from the receivers Rx of the duplexers 622, 822 and 922, and provide one of the divided signals as an input signal for the main system 22 to the reception filters 626, 826 and 926, it may be further contemplated that one of the divided signals is directly provided to the third duplexer 222 of the main system 22 without passing through the reception filters 626, 826 and 926.

Also, while the BS sharing apparatuses according to the sixth and seventh embodiments, described with reference to FIGS. 20 and 21 adopt hybrid couplers, the hybrid couplers can be replaced with magic Ts as in the second embodiment.

The present invention can reduce the area occupied by filters in the overall BS sharing apparatus by using small multi-mode filters (e.g. triple-mode filters) instead of one general large filter (e.g. a 6-tap filter). Furthermore, frequency band pass characteristics can be enhanced by configuring two or more filter units having the same configuration and thus utilizing reflection characteristics.

As is apparent from the above description of the present invention, the wireless communication BS sharing apparatus according to the present invention enables a main BS system and a sub-BS system having a different frequency band, added to the main BS system, to easily share an antenna and a feeder cable.

In the case where the frequency band of the added sub-BS system is adjacent to the frequency band of the existing main BS system, the antenna and the feeder cable can be shared between the sub-BS system and the main BS system.

The wireless communication BS sharing apparatus can be configured simply even when a plurality of sub-BS systems is added.

The wireless communication BS sharing apparatus enables different operation systems to use a specific frequency band separately.

Especially when a frequency-variable filter is used, a single model is sufficient for a plurality of frequency combinations. Therefore, there is no need for developing a plurality of models.

Also, products can be delivered in a short time, management cost can be saved because a number of models need not be fabricated, and mass production is enabled, thus reducing fabrication cost.

Because a plurality of filters are installed altogether and a frequency band can be changed through switching by use of the filters, there is no need for installing, removing and reinstalling filters, thereby saving cost significantly.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A wireless communication base station sharing apparatus for sharing one antenna between a main system and a subsystem, comprising:
    a first signal combiner/divider connected to a transmission/reception signal line of a main system duplexer through a first port, for dividing a signal received through the first port to second and third ports, and combining signals received through the second and third ports according to the phases of the signals and outputting the combined signal through the first port or a fourth port;
    a second signal combiner/divider connected to a transmission/reception signal line of a subsystem duplexer through a fifth port and connected to the antenna through an eighth port, for dividing a signal received through the fifth port to sixth and seventh ports, and combining signals received through the sixth and seventh ports according to the phases of the signals and outputting the combined signal through the fifth port or eighth port;

a first filter unit provided in a signal path between the second port of the first signal combiner/divider and the sixth port of the second signal combiner/divider and including a plurality of filters designed to have different pass bands and switches for selecting one of the plurality of filters, for filtering all or a selected part of a predetermined frequency band; and a second filter unit provided in a signal path between the third port of the first signal combiner/divider and the seventh port of the second signal combiner/divider and including a plurality of filters designed to have different pass bands and switches for selecting one of the plurality of filters, for filtering all or a selected part of a predetermined frequency band.

2. The wireless communication base station sharing apparatus of claim 1, wherein each of the first and second filter units comprises:

a plurality of filters, each having an input end and an output end; and a filter module having a movement plate installed to be movable in interaction with the plurality of filters, an input connector, and an output connector, wherein the input ends and output ends of the plurality of filters and the input and output connectors of the filter module are installed so that when the movement plate moves, the input ends and output ends of the plurality of filters are sequentially connected to the input and output connectors of the filter module, at a predetermined position.

3. The wireless communication base station sharing apparatus of claim 2, wherein movement of the movement plate is rotation and the movement plate is a rotation plate installed rotatably.

4. The wireless communication base station sharing apparatus of claim 2, wherein the filter module further comprises at least one position sensor for sensing a movement state of the movement plate and outputting a sensing signal of the movement state externally.

5. The wireless communication base station sharing apparatus of claim 2, wherein the filter module further comprises a fixing device for fixing the movement plate according to an external control signal.

6. The wireless communication base station sharing apparatus of claim 2, wherein the plurality of filters are stacked to two or more layers and the filter module includes an input connector and an output connector for each layer of filters, and wherein when the movement moves, the input and output ends of a plurality of filters in each layer are sequentially connected to the input and output connectors of the filter module in the layer, at a predetermined position.

7. The wireless communication base station sharing apparatus of claim 2, wherein the plurality of filters are shaped into spheres or sphere-like forms.

8. The wireless communication base station sharing apparatus of claim 2, wherein the input and output ends of the plurality of filters are connected to the input and output connectors of the filter module in a non-contact connection structure in which signals are transferred by mutual capacitance coupling.

9. The wireless communication base station sharing apparatus of claim 1, wherein the first and second signal combiners/dividers are hybrid couplers and the plurality of filters of the first and second filter units are duplexers for passing the transmission and reception frequency bands of the main system.

10. The wireless communication base station sharing apparatus of claim 1, wherein the first and second signal combiners/dividers are magic Ts and the plurality of filters of the first and second filter units are duplexers for passing the transmission and reception frequency bands of the main system, further comprising a first phase rotator provided in a signal path between the first filter unit and the first signal combiner/divider, and a second phase rotator provided in a signal path between the first filter unit and the second signal combiner/divider.

11. The wireless communication base station sharing apparatus of claim 1, further comprising a load resistor having an isolation function, attached to the fourth port of the first signal combiner/divider, directly or through a filter of a transmission band.

12. The wireless communication base station sharing apparatus of claim 1, wherein the first and second signal combiners/dividers are hybrid couplers and the plurality of filters of the first and second filter units are band-pass filters for passing the transmission and reception frequency bands of the main system, further comprising a divider for dividing a signal received from a receiver of the subsystem duplexer, and a reception filter for filtering a divided signal received from the divider and providing the filtered signal to the fourth port of the first signal combiner/divider.

13. The wireless communication base station sharing apparatus of claim 1, wherein the first and second signal combiners/dividers are magic Ts and the plurality of filters of the first and second filter units are band-pass filters for passing the transmission and reception frequency bands of the main system, further comprising a first phase rotator provided in a signal path between the first filter unit and the second port of the first signal combiner/divider, a second phase rotator provided in a signal path between the first filter unit and the sixth port of the second signal combiner/divider, a divider for dividing a signal received from the receiver of the subsystem duplexer, and a reception filter for filtering a divided signal received from the divider and providing the filtered signal to the fourth port of the first signal combiner/divider.

14. The wireless communication base station sharing apparatus of claim 12, further comprising an isolator or a circulator having an isolation function in a signal path between the reception filter and the fourth port of the first signal combiner/divider or between the divider and the reception filter.

15. The wireless communication base station sharing apparatus of claim 1, wherein the first and second signal combiners/dividers are hybrid couplers and the plurality of filters of the first and second filter units are band-pass filters for passing the transmission and reception frequency bands of the main system, further comprising a divider or dividing a signal received from the receiver of the subsystem duplexer and providing one of the divided signals to the fourth port of the first signal combiner/divider.

16. The wireless communication base station sharing apparatus of claim 1, wherein the first and second signal combiners/dividers are magic Ts and the plurality of filters of the first and second filter units are band-pass filters for passing only the transmission frequency band of the main system, further comprising a first phase rotator provided in a signal path between the first filter unit and the second port of the first signal combiner/divider, a second phase rotator provided in a signal path between the first filter unit and the sixth port of the second signal combiner/divider, and a divider or dividing a signal received from the receiver of the subsystem duplexer and providing one of the divided signals to the fourth port of the first signal combiner/divider.

17. The wireless communication base station sharing apparatus of claim 1, wherein the first and second signal combiners/dividers are magic Ts and the plurality of filters of the first and second filter units are band-pass filters for passing the transmission and reception frequency bands of the main system, further comprising a first phase rotator provided in a signal path between the second filter unit and the third port of the first signal combiner/divider, a second phase rotator provided in a signal path between the first filter unit and the sixth port of the second signal combiner/divider, a divider for dividing a signal received from the receiver of the subsystem duplexer, and a reception filter for filtering a divided signal received from the divider and providing the filtered signal to the fourth port of the first signal combiner/divider.

18. The wireless communication base station sharing apparatus of claim 17, further comprising an isolator or a circulator having an isolation function in a signal path between the reception filter and the fourth port of the first signal combiner/divider or between the divider and the reception filter.

19. A wireless communication base station sharing apparatus for sharing one antenna between a main system and a subsystem, comprising:
- a first magic T connected to a transmission/reception signal line of a main system duplexer through a fourth port, for dividing a signal received through the fourth port and outputting the divided signals with the same phase to second and third ports, and combining signals received through the second and third ports according to the phases of the signals and outputting the combined signal through a first port or the fourth port;
- a second magic T connected to a transmission/reception signal line of a subsystem duplexer through a fifth port and connected to the antenna through an eighth port, for dividing a signal received through the fifth port and outputting the divided signals with the same phase to sixth and seventh ports, and combining signals received through the sixth and seventh ports according to the phases of the signals and outputting the combined signal through the fifth or eighth port;
- a first filter unit provided in a signal path between the second port of the first magic T and the sixth port of the second magic T and including a plurality of filters designed to have different pass bands and switches for selecting one of the plurality of filters, for filtering all or a selected part of a predetermined frequency band;
- a second filter unit provided in a signal path between the third port of the first magic T and the seventh port of the second magic T and including a plurality of filters designed to have different pass bands and switches for selecting one of the plurality of filters, for filtering all or a selected part of a predetermined frequency band;
- a first phase rotator provided in a signal path between the second filter unit and the third port of the first magic T;
- a second phase rotator provided in a signal path between the first filter unit and the sixth port of the second magic T;
- a divider for dividing a signal received from a receiver of the subsystem duplexer;
- a reception filter for filtering a divided signal received from the divider; and
- an isolator or a circulator for providing the filtered signal received from the reception filter to the first port of the first magic T.

20. A wireless communication base station sharing apparatus for sharing one antenna between a main system and a subsystem, comprising:
- a first signal combiner/divider connected to a transmission signal line of a main system through a first port, for dividing a signal received through the first port to second and third ports, and combining signals received through the second and third ports according to the phases of the signals and outputting the combined signal through the first port or a fourth port;
- a second signal combiner/divider connected to a transmission signal line of a subsystem through a fifth port, for dividing a signal received through the fifth port to sixth and seventh ports, and combining signals received through the sixth and seventh ports according to the phases of the signals and outputting the combined signal through the fifth port or eighth port;
- a first filter unit provided in a signal path between the second port of the first signal combiner/divider and the sixth port of the second signal combiner/divider and including a plurality of filters designed to have different pass bands and switches for selecting one of the plurality of filters, for filtering all or a selected part of a predetermined frequency band;
- a second filter unit provided in a signal path between the third port of the first signal combiner/divider and the seventh port of the second signal combiner/divider and including a plurality of filters designed to have different pass bands and switches for selecting one of the plurality of filters, for filtering all or a selected part of a predetermined frequency band;
- a duplexer having a transmitter connected to the eighth port of the second signal combiner/divider, for providing a transmission signal from the transmitter to an antenna; and
- a divider for dividing a signal received from a receiver of the duplexer to the main system and the subsystem.

21. The wireless communication base station sharing apparatus of claim 20, wherein the first and second signal combiners/dividers are hybrid couplers.

22. The wireless communication base station sharing apparatus of claim 20, wherein the first and second signal combiners/dividers are magic Ts, further comprising a first phase rotator provided in a signal path between the first filter unit and the second port of the first signal combiner/divider, and a second phase rotator provided in a signal path between the first filter unit and the sixth port of the second signal combiner/divider.

* * * * *